US008141764B1

(12) United States Patent
Potter et al.

(10) Patent No.: US 8,141,764 B1
(45) Date of Patent: Mar. 27, 2012

(54) FRICTION STIR WELDING APPARATUS, SYSTEM AND METHOD

(75) Inventors: David M. Potter, Lakewood, CO (US); Richard K. Hansen, Morrison, CO (US)

(73) Assignee: United Launch Alliance, LLC, Centennial, CO (US)

( * ) Notice: Subject to any disclaimer, the term of this patent is extended or adjusted under 35 U.S.C. 154(b) by 0 days.

(21) Appl. No.: 13/175,573

(22) Filed: Jul. 1, 2011

Related U.S. Application Data

(63) Continuation of application No. 12/755,178, filed on Apr. 6, 2010, now abandoned.

(51) Int. Cl.
  B23K 20/12 (2006.01)
  B23K 37/04 (2006.01)

(52) U.S. Cl. ............... 228/2.1; 228/44.5; 228/49.3

(58) Field of Classification Search .......... None
See application file for complete search history.

(56) References Cited

U.S. PATENT DOCUMENTS

| 3,414,950 | A |   | 12/1968 | Phariss |
|---|---|---|---|---|
| 3,702,913 | A |   | 11/1972 | Kazluaskas et al. |
| 3,704,503 | A |   | 12/1972 | Haywood |
| 3,705,453 | A |   | 12/1972 | Olson |
| 3,901,497 | A |   | 8/1975 | Dearman |
| 3,910,480 | A |   | 10/1975 | Thatcher |
| RE28,709 | E | * | 2/1976 | Crook, Jr. .................. 294/82.2 |
| 3,944,202 | A |   | 3/1976 | Dearman |
| 3,952,936 | A |   | 4/1976 | Dearman |
| 4,063,676 | A |   | 12/1977 | Lilly |
| 4,081,651 | A | * | 3/1978 | Randolph et al. ............... 219/61 |
| 4,356,615 | A | * | 11/1982 | Dearman ...................... 29/525 |
| 4,380,348 | A |   | 4/1983 | Swartz |
| 4,542,276 | A |   | 9/1985 | van den Berg |
| 4,750,662 | A |   | 6/1988 | Kagimoto |
| 5,126,523 | A |   | 6/1992 | Rinaldi |
| 5,415,435 | A |   | 5/1995 | Colbert |
| 5,435,479 | A |   | 7/1995 | Puzey et al. |
| 5,460,317 | A |   | 10/1995 | Thomas et al. |
| 5,673,843 | A |   | 10/1997 | Gainey |
| 5,697,511 | A |   | 12/1997 | Bampton |
| 5,697,544 | A |   | 12/1997 | Wykes |
| 5,718,366 | A |   | 2/1998 | Colligan |

(Continued)

FOREIGN PATENT DOCUMENTS

JP          55-073477          6/1980

(Continued)

OTHER PUBLICATIONS

Bjorkman et al. "Tool for Friction Stir Tack Welding of Aluminum Alloys." NASA Tech Briefs, Mar. 1, 2003, vol. 27, No. 3, p. 65.

(Continued)

Primary Examiner — Kiley Stoner
(74) Attorney, Agent, or Firm — Sheridan Ross, P.C.

(57) ABSTRACT

A friction stir welding system is provided herein. More specifically, traditional friction stir welding requires a rotatable head that is forced against a plurality of work pieces to bond the same. The rotational and normal forces generated by the friction stir welding tool are generally reacted by a backing plate, anvil, mandrel or other mechanisms, such hardware are subject to the applied forces and are often supported with additional internal supports. Conversely, a friction stir weld system is described that omits the need for such a backing member and internal supports as it is performed using a self reacting pin tool.

18 Claims, 19 Drawing Sheets

U.S. PATENT DOCUMENTS

| | | | |
|---|---|---|---|
| 5,769,306 A | 6/1998 | Colligan | |
| 5,794,835 A | 8/1998 | Colligan et al. | |
| 5,813,592 A | 9/1998 | Midling et al. | |
| 5,971,247 A | 10/1999 | Gentry | |
| 5,971,252 A | 10/1999 | Rosen et al. | |
| 5,975,405 A | 11/1999 | Tsuchiya et al. | |
| 5,975,406 A | 11/1999 | Mahoney et al. | |
| 6,045,027 A | 4/2000 | Rosen et al. | |
| 6,070,784 A | 6/2000 | Holt et al. | |
| 6,098,866 A | 8/2000 | Tsuchiya et al. | |
| 6,138,895 A | 10/2000 | Oelgoetz et al. | |
| 6,206,268 B1 | 3/2001 | Mahoney | |
| 6,213,379 B1 | 4/2001 | Takeshita et al. | |
| 6,227,430 B1 | 5/2001 | Rosen et al. | |
| 6,230,957 B1 | 5/2001 | Arbegast et al. | |
| 6,237,835 B1 | 5/2001 | Litwinski et al. | |
| 6,247,634 B1 | 6/2001 | Whitehouse | |
| 6,257,479 B1 | 7/2001 | Litwinski et al. | |
| 6,259,052 B1 | 7/2001 | Ding et al. | |
| 6,273,320 B1 | 8/2001 | Siebert et al. | |
| 6,364,197 B1 | 4/2002 | Oelgoetz et al. | |
| 6,367,681 B1 | 4/2002 | Waldron et al. | |
| 6,398,883 B1 | 6/2002 | Forrest et al. | |
| 6,450,395 B1 | 9/2002 | Weeks et al. | |
| 6,459,062 B1 | 10/2002 | Guerrina | |
| 6,460,752 B1 | 10/2002 | Waldron et al. | |
| 6,464,127 B2 | 10/2002 | Litwinski et al. | |
| 6,484,924 B1 | 11/2002 | Forrest | |
| 6,516,992 B1 | 2/2003 | Colligan | |
| 6,537,682 B2 | 3/2003 | Colligan | |
| 6,543,671 B2 | 4/2003 | Hatten et al. | |
| 6,568,582 B2 | 5/2003 | Colligan | |
| 6,660,106 B1 | 12/2003 | Babel et al. | |
| 6,742,697 B2 | 6/2004 | McTernan et al. | |
| 6,779,707 B2 | 8/2004 | Dracup et al. | |
| 6,780,525 B2 | 8/2004 | Litwinski | |
| 6,837,311 B1 | 1/2005 | Sele et al. | |
| 6,840,433 B2 | 1/2005 | Vermaat | |
| 6,848,163 B2 | 2/2005 | Bampton et al. | |
| 6,908,690 B2 | 6/2005 | Waldron et al. | |
| 6,913,186 B2 | 7/2005 | Vyas | |
| 6,924,452 B2 | 8/2005 | Kimura | |
| 6,953,140 B2 | 10/2005 | Park et al. | |
| 6,955,283 B2 | 10/2005 | Kendall et al. | |
| 6,986,452 B2 | 1/2006 | Dracup et al. | |
| 6,994,242 B2 | 2/2006 | Fuller et al. | |
| 7,000,303 B2 | 2/2006 | Talwar et al. | |
| 7,156,276 B2 | 1/2007 | Slattery | |
| 7,163,136 B2 | 1/2007 | Hempstead | |
| 7,195,143 B2 | 3/2007 | Reeson | |
| 7,201,811 B2 | 4/2007 | Babel et al. | |
| 7,255,258 B2 | 8/2007 | Burford et al. | |
| 7,347,351 B2 | 3/2008 | Slattery | |
| 7,398,909 B2 | 7/2008 | Dick | |
| 7,404,512 B2 | 7/2008 | Baumann et al. | |
| 7,441,686 B2 | 10/2008 | Odajima et al. | |
| 7,451,661 B2 | 11/2008 | Burton et al. | |
| 7,487,901 B2 | 2/2009 | Talwar et al. | |
| 7,537,150 B2 | 5/2009 | Burton et al. | |
| 7,540,401 B2 | 6/2009 | Vermaat | |
| 7,571,654 B2 | 8/2009 | Burton et al. | |
| 7,581,665 B2 | 9/2009 | Burton et al. | |
| 7,617,965 B2 | 11/2009 | Burton et al. | |
| 7,624,910 B2 | 12/2009 | Barnes et al. | |
| 7,641,739 B2 | 1/2010 | Matlack et al. | |
| 7,681,773 B2 | 3/2010 | Burton et al. | |
| 7,690,164 B2 | 4/2010 | Walker et al. | |
| 7,699,206 B2 | 4/2010 | Matlack et al. | |
| 7,703,654 B2 | 4/2010 | Burton et al. | |
| 7,753,252 B2 | 7/2010 | Taylor et al. | |
| 7,780,065 B2 | 8/2010 | Vermaat | |
| 7,841,504 B2 | 11/2010 | Slattery et al. | |
| 7,866,532 B1 | 1/2011 | Potter et al. | |
| 7,896,216 B2 | 3/2011 | Fujimoto et al. | |
| 2001/0040179 A1 | 11/2001 | Tochigi et al. | |
| 2003/0217994 A1 | 11/2003 | Ding | |
| 2005/0120534 A1 | 6/2005 | Carns et al. | |
| 2006/0289608 A1 | 12/2006 | Steel et al. | |
| 2007/0075121 A1 | 4/2007 | Slattery | |
| 2007/0181647 A1 | 8/2007 | Ford et al. | |
| 2007/0261226 A1 | 11/2007 | Deul et al. | |
| 2008/0011810 A1 | 1/2008 | Burford | |
| 2008/0083817 A1 | 4/2008 | Baumann et al. | |
| 2008/0230584 A1 | 9/2008 | Lederich et al. | |
| 2008/0302539 A1 | 12/2008 | Mallenahalli et al. | |
| 2009/0014500 A1 | 1/2009 | Cho et al. | |
| 2009/0113689 A1 | 5/2009 | Matlack et al. | |
| 2009/0134203 A1 | 5/2009 | Domec et al. | |
| 2009/0184201 A1 | 7/2009 | Talwar et al. | |
| 2009/0223621 A1 | 9/2009 | Burton et al. | |
| 2009/0258232 A1 | 10/2009 | Brice | |
| 2009/0308582 A1 | 12/2009 | Nagurny et al. | |
| 2010/0006622 A1 | 1/2010 | Smith et al. | |
| 2010/0065092 A1 | 3/2010 | Matlack et al. | |
| 2010/0092789 A1 | 4/2010 | Heck et al. | |
| 2010/0126968 A1 | 5/2010 | Page | |
| 2010/0140321 A1 | 6/2010 | Eller et al. | |
| 2010/0213244 A1 | 8/2010 | Miryekta et al. | |
| 2010/0230470 A1* | 9/2010 | Kuchuk-Yatsenko et al. | 228/44.5 |

FOREIGN PATENT DOCUMENTS

| | | |
|---|---|---|
| JP | 2003-112272 | 4/2003 |
| JP | 2005-329463 A * | 12/2005 |

OTHER PUBLICATIONS

Brown et al. "Self-Reacting Friction Stir Weld for Aluminum Complex Curvature Applications," Aeromat 2003, Dayton, OH, Jun. 2003, 31 pages.

Bjorkman et al. "Self-Reacting Friction Stir Welding for Aluminum Alloy Circumferential Weld Application," ASM Aeromat 2003, Jun. 2003, 28 pages.

* cited by examiner

FRICTION STIR WELDING APPARATUS, SYSTEM AND METHOD

CROSS-REFERENCE TO RELATED APPLICATIONS

This application is a continuation of U.S. patent application Ser. No. 12/755,178 which was filed on Apr. 6, 2010, now abandoned, and is hereby incorporated in its entirety by reference.

FIELD OF THE INVENTION

Embodiments of the present invention are related generally to metal fusion using a dynamic weld head to bond arcuate work pieces. More specifically, a weld fixture with external support rings holds the work pieces and a self-reacting friction stir welding tool bonds cylindrical shaped work pieces wherein a backing member is not required to counteract forces generated by the weld tool.

BACKGROUND OF THE INVENTION

Friction stir welding is a beneficial metal bonding technique wherein materials such as aluminum 7075, various alloys of aluminum/lithium and other similar materials previously considered to be unweldable, can be bonded. Friction stir welding also forms joints that possess material properties similar to those of the parent materials. Further, this technique also provides welds with extremely low dimensional distortion.

Unlike fusion welding, in which portions of each work piece being joined are melted and then resolidified to form a new and different material structure in the area of the weld, friction stir welding is a solid state process. More specifically, bonding is accomplished by simultaneously stirring, heating and intermixing plasticized material from each work piece across the joint boundary. Friction stir welding generally employs a stepped cylindrical tool having a head pin (also known as a probe) surrounded at its root by a shoulder. The tool is rotated at a precise speed while being pressed against the work pieces at the joint with substantial force, which may up to about 12,000 pounds. Friction between the rotating pin and work pieces causes localized heating and plasticizing of the material adjacent to the pin. Heating reduces the yield stress of the material properties of the parent material. In operation, contact between the pin and the work pieces generates heat that causes the material to yield, thereby allowing the pin to plunge into the work pieces such that the shoulder of the tool will contact the surface of the work pieces. The material adjacent to the joint is then blended by translating the spinning tool along the joint at a carefully controlled rate. To optimize a weld formed by traditional friction stir welding techniques, it is also known to alter the angle between the shoulder and the surface of the work pieces. As the pin and shoulder spin and move relative to the work pieces the pin and shoulder simultaneously heat and move the work piece material from the leading edge of the tool to the trailing edge of the tool. Translation of the tool along the joint may be accomplished by moving the tool or by moving the work pieces relative thereto.

Propellant tanks for launch vehicles are commonly comprised of relatively thin cylindrical bodies with dome-shaped ends. The cylindrical portions of the propellant tanks are often additionally reinforced with integrated ribs, isogrids or other types of internal stiffening members. Internal stiffening members are machined in flat tank panels that are then bent subsequent to machining to form curved barrel panels that are interconnected by longitudinal welds to form cylindrical barrel sections. Two barrel sections are abutted to define a circumferential joint that is welded to form a portion of an elongated cylindrical propellant tank. The dome shaped ends are welded to the ends of the welded barrel sections to complete the propellant tank. Usually at least one dome includes an access opening that permits personnel to enter the completed propellant tanks to facilitate construction, permit inspections, etc.

One advantage of friction stir welding is that it is solid state, i.e., a weld technique that does not require weld rods and other materials traditionally used to fill a gap between abutting work pieces. In addition, since the work pieces are not brought to a temperature to cause melting of the parent material, cooling and the distortions associated therewith are less of a concern. The heat affected zone associated with the weld is also decreased since the work pieces do not become molten prior to fusing. Furthermore, by reducing the heat needed to fuse the metals, weld porosity is decreased, solid redistribution is decreased, solidification cracking is decreased, and liquefaction cracking is reduced. Reduction of the afore-mentioned common welding drawbacks lead to a low concentration of weld defects overall, which makes friction stir welding a very tolerant welding technique and well suited for fabricating propellant tanks.

Other advantages of friction stir welding include (i) the formation of welds with good mechanical properties, (ii) increased safety in which dangerous splattering of molten material is eliminated, (iii) cost savings in which no filler or gas is required, (iv) the method is easily automated and (v) the welds produced require less post welding machining.

One drawback with friction stir welding is associated with the considerable force that must be exerted by the stir welding tool on the work piece. More specifically, the work piece must be supported by a suitable backing member such as an anvil, or mandrel in the case of circumferential friction stir welding, to counteract the applied forces by the weld tool. Mandrels also help prevent geometrical mismatch between the work pieces being joined. Thus, when welding propellant tanks, the backing member must be located inside the tank. Without the use of a counteracting backing member, tank distortions and inadequate weld penetration can result.

Another disadvantage with friction stir welding is that the end weld is incomplete because a hole associated with the pin remains when the friction stir welding tool is removed from the joint. This hole must be subsequently plugged by traditional welding techniques or by friction stir plug welding techniques that employ a push or pull plug.

It is a related disadvantage of friction stir welding that the backing member must be removed after welding is completed. After welding of a closed vessel such as a tank, access to the interior of the welded tank is often limited. In some instances, access doors or hatches are provided that give access into the welded tank, but often these penetrations are typically small to facilitate proper closing of the tank. Accordingly, heavy duty backing mandrels must often be removed from very small openings in the tank, an operation that is very difficult and time consuming. Further, any contact between the backing tools and the tank may cause damage requiring expensive retesting and requalification of the propellant tank. Finally, working inside a tank invokes certain OSHA regulations related to the working in closed environments. For example, regulations may require the use of breathing apparatus or a flow of oxygen and a confined spaces permits may be required. These measures obviously increase the cost of performing the weld operation.

Friction stir welding is described in various patents. For example, U.S. Pat. No. 5,460,317 discloses a rotating tool that is used to create heat sufficient to fuse adjacent work pieces. For example, U.S. Pat. No. 5,813,592 to Midling et al., describes friction stir welding of plates. U.S. Pat. No. 4,063,676 to Lilly discloses circumferential friction stir welding wherein an expanding plug is mounted to a mandrel positioned within a tube or a pipe. U.S. Pat. No. 6,247,634 to Whitehouse describes friction stir welding of a tank wherein an anvil assembly is positioned within the tank to resist the force of the pin. U.S. Pat. No. 7,441,686 to Odheima et al., discloses a method of friction stir welding employing a backing member. U.S. Pat. No. 5,697,511 to Bampton teaches circumferential friction stir welding that employs a support structure. U.S. Pat. No. 6,070,784 to Holt et al., discloses a method of circumferential friction stir welding that uses internal supports. U.S. Pat. No. 6,257,479 to Liwiniski et al., discloses the method of friction stir welding of pipes that employs a backing tooling apparatus. Finally, U.S. Pat. No. 5,794,835 to Coloigan et al., discloses a traditional friction stir welding tool. One skilled in the art will appreciate upon review of the foregoing prior art that each require a backing anvil or other tools resist the force applied by the friction stir welding tool.

Thus, there is still a need in the field of welding to provide a friction stir welding tool that can be used to join cylindrical work pieces wherein a backing member is not required. The following disclosure describes an improved circumferential friction stir welding system and method that do not require a backing member and is ideal to join barrel sections of a booster rocket.

SUMMARY OF THE INVENTION

The present invention provides an apparatus, system, and method of welding two cylindrically-shaped members. One embodiment of the present invention employs friction stir welding wherein a tool is rotated and moved relative to a joint defined by abutting work pieces. As the tool is moved relative to the work pieces (or vice versa), material is frictionally heated and plastically transitioned, i.e., stirred, to fuse the work pieces. Although one skilled in the art will appreciate that traditionally friction stir welding has been used with respect to metallic materials, it could be used to join other materials, such as heavy duty plastics, for example. In one embodiment of the present invention the work pieces are comprised of aluminum 2014 at about 0.41 inches thick or greater wherein an internal mandrel is not required, as described in further detail below.

Apparatus for Performing Circumferential Friction Stir Welding without an Internal Mandrel.

One embodiment of the present invention employs a series of externally-situated rings and associated tools. The rings stiffen the exterior of the circumferential barrel sections adjacent to the joint with the rotating friction stir welding tool therebetween. The rings provide a support that helps counteract loads generated by the friction stir welding tool that are not counteracted by the internally-situated shoulder. The rings also help secure the work pieces relative to each other prior to and during welding, and thus minimize misalignment between the work pieces to facilitate the creation of a high strength weld. The rings may include external adjustments that remove mismatch between the work pieces that may be apparent when a backing member is not employed. Further, the external tooling also acts as a heat sink that draws heat from the joint, thereby reducing the heat affected zone.

It is yet another aspect of the present invention to provide an apparatus for maintaining and selectively altering work pieces being bonded by friction stir welding, wherein the work pieces are abutted to form a seam. This system comprises a first ring assembly and a second ring assembly. The first ring assembly is positioned on one side of the seam and includes an inner ring interconnected to an outer ring by way of a center ring, a plurality of clamp assemblies interconnected to a first surface of said center ring, and a plurality of plates interconnected to a second surface of said center ring. The second ring assembly is positioned on one side of the seam opposite from said first ring assembly and includes an inner ring interconnected to an outer ring by way of a center ring, a plurality of clamp assemblies interconnected to a first surface of said center ring, and a plurality of plates interconnected to a second surface of said center ring.

One embodiment of the present invention employs a self-reacting pin tool that is used to weld work pieces of constant or tapered thicknesses. Preferably, the tool consists of two shoulders with a pin therebetween wherein an outer shoulder is situated on an outer portion of the work pieces and an inner shoulder is situated on an inner portion of the work pieces. To accommodate the curvature of the work pieces, the inner shoulder often has a tapered or rounded edge. The shoulders tightly engage both opposite surfaces of the work pieces so that forces applied by each shoulder are generally cancelled. In addition, since two shoulders are used to generate heat, tool rotation speed can be reduced. More specifically, convention friction stir welding tools generate forces in the 10,000 to 20,000 lb range but as the self-reacting tool of embodiments of the present invention employs opposing shoulders, the forge forces are typically about 2000 to 4000 lb.

By alleviating some, if not all of the inwardly directed normal force generated by the tool, no backing member or any other internal tooling is needed to stabilize the work pieces during joining is required, tooling cost is reduced, safety is increased, occurrences of tank damage are reduced, and time associated with welding of a propellant tank is reduced. In addition, since the self reacting pin tool completely penetrates the work pieces being joined, the finished weld spans the entire thickness thereof and weld cracking is reduced. Further, friction stir welding with a self-reacting pin tool may be used to join members usually bonded with traditional techniques where the geometry of the work pieces prevents the use of a backing member. That is, inner shoulder may be adapted to fit into tighter spaces, thereby making friction stir welding feasible for applications previously relegated to traditional welding techniques.

Method of Circumferential Friction Stir Welding without Using an Internal Mandrel.

In another aspect of the present invention, a circumferential friction stir weld method is provided that omits the need of an internal mandrel, backing anvil or any other internal backing member or mechanism to stabilize the work pieces (hereinafter "backing member") being bonded or to counteract loads generated by the friction stir welding tool.

A method is provided for performing circumferential stir welding without an internal mandrel or any internal support for the hardware. This method employs the first ring assembly and the second ring assembly described above. In operation a first plate having an arcuate outer surface and a first end is aligned with a second plate having an arcuate outer surface and a second end, wherein the outer surface of said first plate and said second plate are situated such that said first end and said second end are abutted to form a seam. The first ring assembly is then located adjacent to the first end and the second ring assembly is located adjacent to the second end, wherein the first ring assembly is spaced from the second ring assembly with said seam therebetween. The ring assemblies omit the need for internal supports and provide all the support needed direction normal of the plate outer surfaces. One contemplated method further includes creating a bore in the first plate and the second plate wherein a portion of the bore is intersected by the seam and placing a pin of a rotating tool within the bore. The tool is forced onto the first plate and the second plate wherein the force applied is reacted only by at least one of the first ring assembly and the second ring assembly. The tool is then rotated and translated with respect to the first plate and the second plate to form a weld therebetween. After the weld is completed, the pin is removed from the seam and the associated hole is plugged.

Method of Creating Tack Welds for Circumferential Friction Stir Welding.

It is another aspect of the present invention to provide a method of friction stir welding that employs tack welds. Tack welds are commonly used to prevent movement of the work pieces prior to welding. In the present invention, tack welds are of such a size and thickness that they break when in close proximity as the friction stir weld tool approaches each tack weld. Tack welds are formed at predetermined locations (often in a star pattern, for example) about the joint and help prevent hardware movement and mismatch during the friction stir weld process. Tack welds temporarily hold the work pieces together so that the primary weld can be properly formed. In the present invention, tack welds are such a size and thickness that they break when in close proximity to the friction stir welding tool as it approaches each tack weld. For example, a plurality of tack welds are created about the circumference of the barrel section. After the last tack weld is formed, the tool is engaged in the joint and is moved along the joint to form the primary weld. As the tool meets a tank weld it will "unzip" or break the tack welds, thereby re-stirring the metal. That is, when the tool comes in close proximity of a tack weld, the tack weld is destroyed and replaced by the primary weld. A major advantage of this process is that adjacent work pieces are sufficiently constrained by the tack welds just prior to the contemplated weld event. The self-reacting pin tool generates equal and opposite forces that will also align the work pieces to remove mismatch just prior to being welded. In practice, traditional welding techniques are used to create the requisite tack welds. Preferably, however, a specialized friction stir welding pin tool that generates low forge loads is employed to create the tack welds and thus no backing anvil is required. The specialized tool of one embodiment possesses an elongated pin and a decreased shoulder.

It is another aspect of the present invention to provide a method of creating tack welds in a "skip stitch" pattern. A skip stitch pattern is more specifically described as welding a small continuous portion or length and then moving the welding tool to another area to create a similar weld. Typically, the welds are spaced in a star pattern to even out tolerance differences.

It is yet another aspect to provide a method of creating tack welds associated with circumferential stir welding without an internal mandrel or any internal support for the hardware. The contemplated method employs the first ring assembly and the second ring assembly described above. In operation a first plate having an arcuate outer surface and a first end is aligned with a second plate having an arcuate outer surface and a second end, wherein the outer surface of said first plate and said second plate are situated such that said first end and said second end are abutted to form a seam. The first ring assembly is then located adjacent to the first end and the second ring assembly is located adjacent to the second end, wherein the first ring assembly is spaced from the second ring assembly with said seam therebetween. The ring assemblies omit the need for internal supports and provide all the support needed direction normal of the plate outer surfaces. A rotating tool with an associated pin is spun to a predetermined rate and associated with a first portion of the seam, which is comprised of forcing the tool onto the first plate and the second plate wherein the force is reacted only by at least one of the first ring assembly and the second ring assembly. The tool is forced onto the first plate and the second plate wherein the force applied is reacted only by at least one of the first ring assembly and the second ring assembly. As one of skill in the art will appreciate the tool is then rotated and translated with respect to the first plate and the second plate to form a weld therebetween. The pin is then removed from the seam and moved to a second portion of the seam and the process is repeated.

Apparatus for Forming Friction Stir Welding Using Tack Welds Prior to Forming a Circumferential Weld.

It is yet another aspect of the present invention to provide an apparatus for performing friction stir weld tacking that is used without an internal mandrel. The tool includes an elongated tip to increase penetration into the joint and a small shoulder. The small shoulder produces less load wherein an internal mandrel is not required. The tip length and decreased shoulder size will produce the requisite heat and mixing to temporarily fuse the work pieces without producing forge loads that would create work piece mismatch.

As mentioned, the primary weld will is interrupted by a single hole associated with the removal of the pin that is subsequently plugged by known techniques. One solution employs a pull plug having an enlarged end with a shaft extending therefrom. The shaft is placed in the hole left by the tool wherein the enlarged end positioned within the cylindrical work piece. The plug is then spun and pulled from the welded tank, thereby securing the plug in the hole. The shaft is then trimmed and the area is planished.

One embodiment of the present invention employs a traditional fixed pin tool design that produces reduced loads as described above. These low loads help reduce the amount of mismatch and deflection that generally occurs when attempting to use a traditional friction stir weld tool on a circumferential tack weld with a backing anvil or member. Friction stir welding or other welding techniques may be used to form the tack welds as well but may require internal backing to react the loads associated therewith.

It is therefore another aspect of the present invention to provide a system for maintaining and selectively altering work pieces being bonded by friction stir tack welding with a rotating pin tool. The contemplated method employs the first ring assembly and the second ring assembly described above. The apparatus uses a rotating tool for engagement into the seam, wherein the tool includes a shoulder with a pin extending therefrom.

OTHER ADVANTAGES OF EMBODIMENTS OF THE PRESENT INVENTION

It is another aspect of the present invention to provide a system that increases the amount of circumferential friction stir welds used in an object to be welded, without the associated costs associated therewith. For example, such a system relieves manpower associated with a welding task by removing the need to move tooling, backing members, etc. More specifically, in the realm of launch vehicle production, propellant tanks are generally comprised of cylindrical barrel segments each comprised of longitudinally welded barrel panels. The barrel segments are capped by end domes to form a propellant tank. The portions of some pressure-stabilized tanks are joined by resistance welds. Heavier, thicker structurally stable barrel segments must be joined by other techniques such as arc welding, which requires filler. Typically, a booster segment, which comprises at least two propellant tanks, fourteen or more circumferential welds are required, i.e., between sumps and domes, domes and skirts, domes and barrels, barrel segments and barrel, segment and barrel and dome. The contemplated apparatus and methods disclosed herein may be used to weld more of the circumferential welds of a booster tank.

It is another improvement of the present invention to provide a system of increasing weld efficiency. More specifically, with respect to booster tank construction, the prior art method involves the welding of barrel sections in various orientations, which increases the time and complexity of fabrication. Generally, barrels that make up the booster tank/propellant tanks are comprised of a plurality of flat panels that are bent and then welded to form a cylindrical barrel segment. The longitudinal welds of the barrel segment are often traditional linear friction stir welds. Typically, barrel segments, cylindrical skirts, and dome sections are welded in a vertical orientation wherein the components are rotated relative to a traditional welding tool to create portions of the propellant tank. Various skirts, adapters, domes, etc. are also welded in this fashion. The tank portions are welded in a horizontal orientation wherein the pre-welded assembly is rotated relative to the welding tool. Thus, in the prior art, barrel panels are longitudinally welded in the vertical direction to form the barrel segments that are reoriented (i.e., longitudinal welds placed generally parallel to horizontal). The re-oriented barrel segments are then welded. These various movements and reorientation procedures increase the risk of damage and injury, are time consuming, and are costly.

The present invention facilitates welding of a propellant tank by stacking barrel panels, domes, etc., vertically on one rotatable fixture, i.e., a turn table. Stacking the components, or subassemblies thereof, reduces the space required to weld a propellant tank and friction stir welding circumferential joints is made more feasible. Further, the weight of the stacked components will help maintain the location of the work pieces relative to each other and helps prevent movement during welding and/or mismatch. Welding in a vertical position helps alleviate other drawbacks such as gravitational related weld deformations. The vertical position also ensures that the weld integrity is consistent around the circumference of the tank. It is a related aspect of the present invention to therefore facilitate manufacturing of a booster tank/propellant tanks wherein a single station may be provided for preparing, trimming, welding, non destructive inspecting (NRI) and plug welding to close out the friction stir weld.

It should be appreciated that the present invention provides friction stir welding methods that can be used in various fields. The teachings herein are applicable to many fields, such as ship building (deck panels, bulk heads, etc.), railways (high speed train bodies), automotive (sheet metal fusion), aerospace (fuselage fabrication), nuclear energy (waste canisters), oil industry pipes and other pressure vessels. One skilled in the art will appreciate that the methods described herein may be used equally well in other welding applications wherein it is desirable to avoid using an internal support, a backing anvil or other tool.

The Summary of the Invention is neither intended nor should it be construed as being representative of the full extent and scope of the present invention. Moreover, references made herein to "the present invention" or aspects thereof should be understood to mean certain embodiments of the present invention and should not necessarily be construed as limiting all embodiments to a particular description. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

Figure 1:
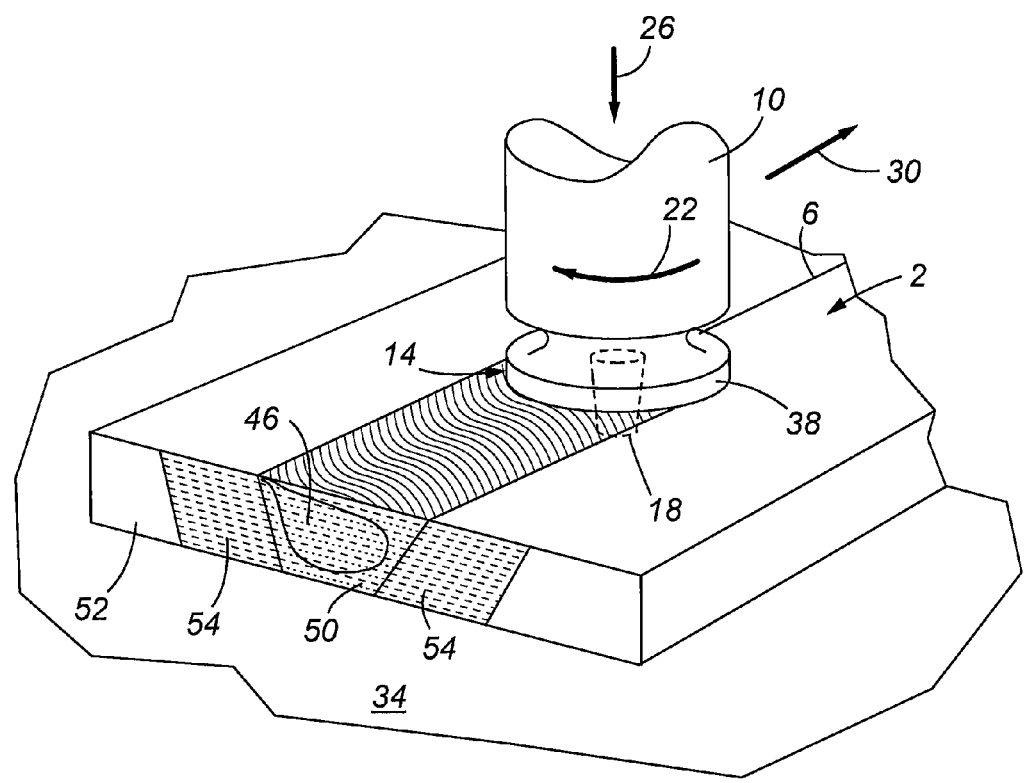
FIG. 1 is a partial perspective view of a traditional friction stir welding tool bonding two work pieces.

To assist in the understanding of the present invention the following list of components and associated numbering found in the drawings is provided herein:

| # | Component |
|---|---|
| 2 | Work piece |
| 6 | Joint |
| 10 | Welding head |
| 14 | Shoulder |
| 18 | Pin |
| 22 | Rotation |
| 26 | Force |
| 30 | Direction of travel |
| 34 | Backing bar |
| 38 | Leading edge |
| 42 | Trailing edge |
| 46 | Weld nugget |
| 50 | Thermo mechanically affected zone (TMAZ) |
| 52 | Unaffected material |
| 54 | Heat affected zone (HAZ) |
| 58 | Self-reacting pin tool |
| 62 | Top shoulder |
| 66 | Bottom shoulder |
| 70 | Nut |
| 74 | Weld fixture |
| 78 | Upper ring assembly |
| 82 | Lower ring assembly |
| 86 | Linkage |
| 90 | Jack stand |
| 94 | Skirt |
| 98 | Barrel segment |
| 102 | Turn table |
| 106 | Spacer |
| 110 | Upper ring segment |
| 114 | Lifting assembly |
| 118 | Capture hook |
| 122 | Center ring |
| 126 | Outside ring |
| 130 | Inner ring |
| 134 | Padding |
| 138 | Gusset plate |
| 142 | Segment clamp |
| 146 | Riser plate |
| 150 | Lower ring segment |
| 154 | Jack extenders |
| 158 | Center ring |
| 162 | Inner ring |
| 166 | Outer ring |
| 170 | Padding |
| 174 | Clamp assembly |
| 178 | Gusset plate |
| 182 | Push guide |
| 186 | Base |
| 190 | Swivel clamp |
| 194 | Padding |
| 198 | Dome |
| 202 | Welding assembly |
| 206 | Sump |
| 210 | Tack weld |
| 214 | Spiral |
| 218 | Groove |

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Referring now to FIG. 1, a prior art friction stir weld technique is illustrated wherein work pieces 2 are abutted to form a joint 6 therebetween. A friction stir welding tool includes a head 10 with associated shoulder 14 and pin 18. In practice, the shoulder 14 is placed on the work pieces 2 and the pin 18 is placed within the joint 6 after sufficient heat is generated by the spinning tool to allow penetration thereof. The head 10 is then forced downwardly onto the work pieces 2 as indicated by arrow 26 and is transitioned relative thereto 30. One skilled in the art will appreciate that the work pieces 2 may also move relative to the rotating head 10. The force 26 generated by the head 10 is reacted by a backing bar 34. As the head 10 is rotated and moved forward in the direction 30, friction is generated by the shoulder 14 and the pin 18 which keeps the metal of a portion of both work pieces 2 such that metal adjacent to a leading edge 38 of the shoulder 14 is moved/displaced to a trailing edge 42 of the shoulder 14. It is important to note that this method does not create a great amount of heat such that the detrimental affects thereof are reduced and work pieces will be comprised of unaffected material 52. The location of the greatest amount of heat generated forms a weld nugget 46. Adjacent to the weld nugget 46 is a thermomechanically affected zone (TMAZ) 50 and adjacent thereto is a heat affected zone (HAZ) 54. The heat affected zone 54 resulting from friction stir welding techniques is a fraction of what it would be using traditional welding techniques, such as tungsten inert gas welding, for example. Again, the backing bar 34 is needed to react the force 26 generated by the welding head.

Figure 2:
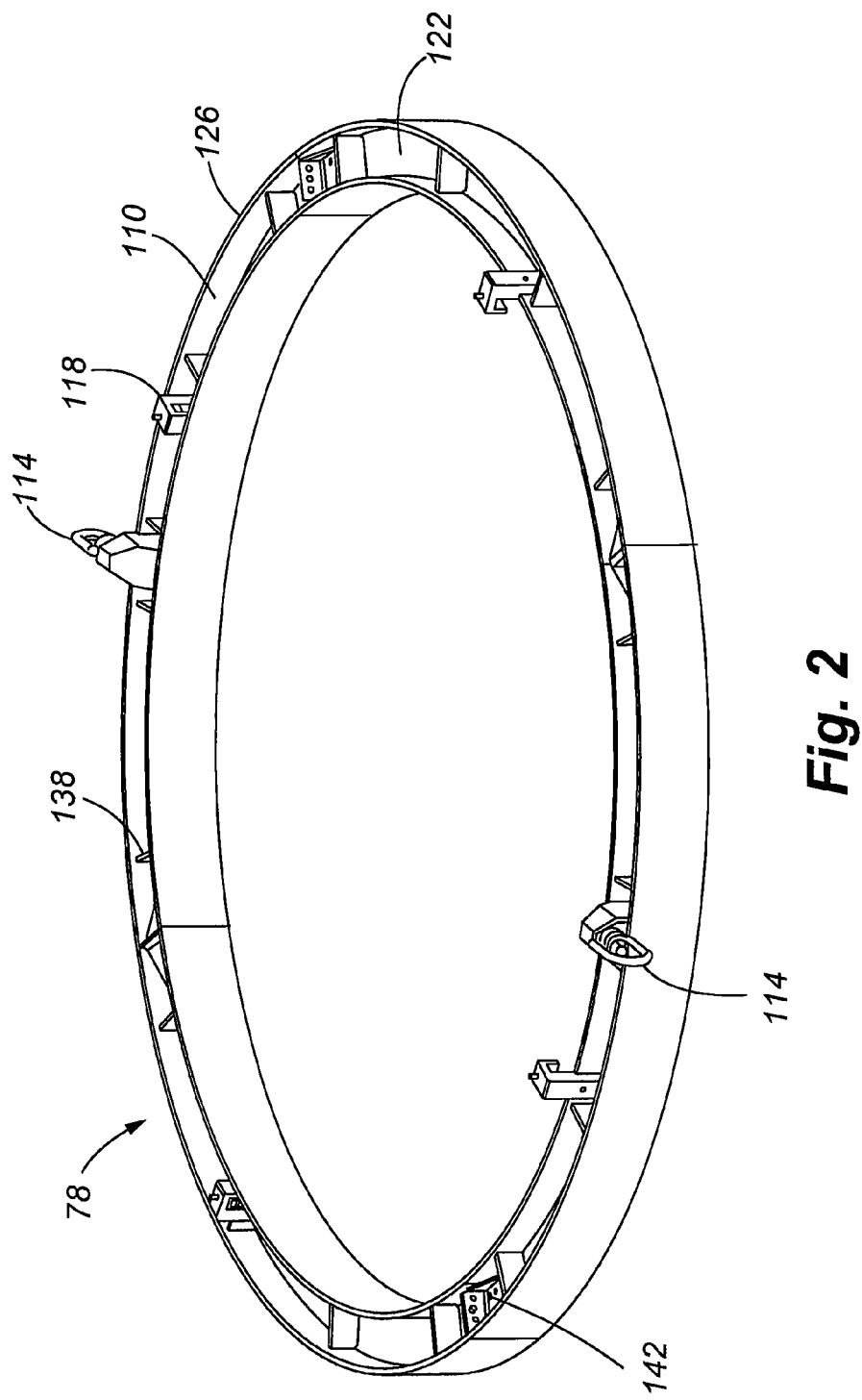
FIG. 2 is a perspective view of an upper ring assembly of the present invention.
Figure 3:
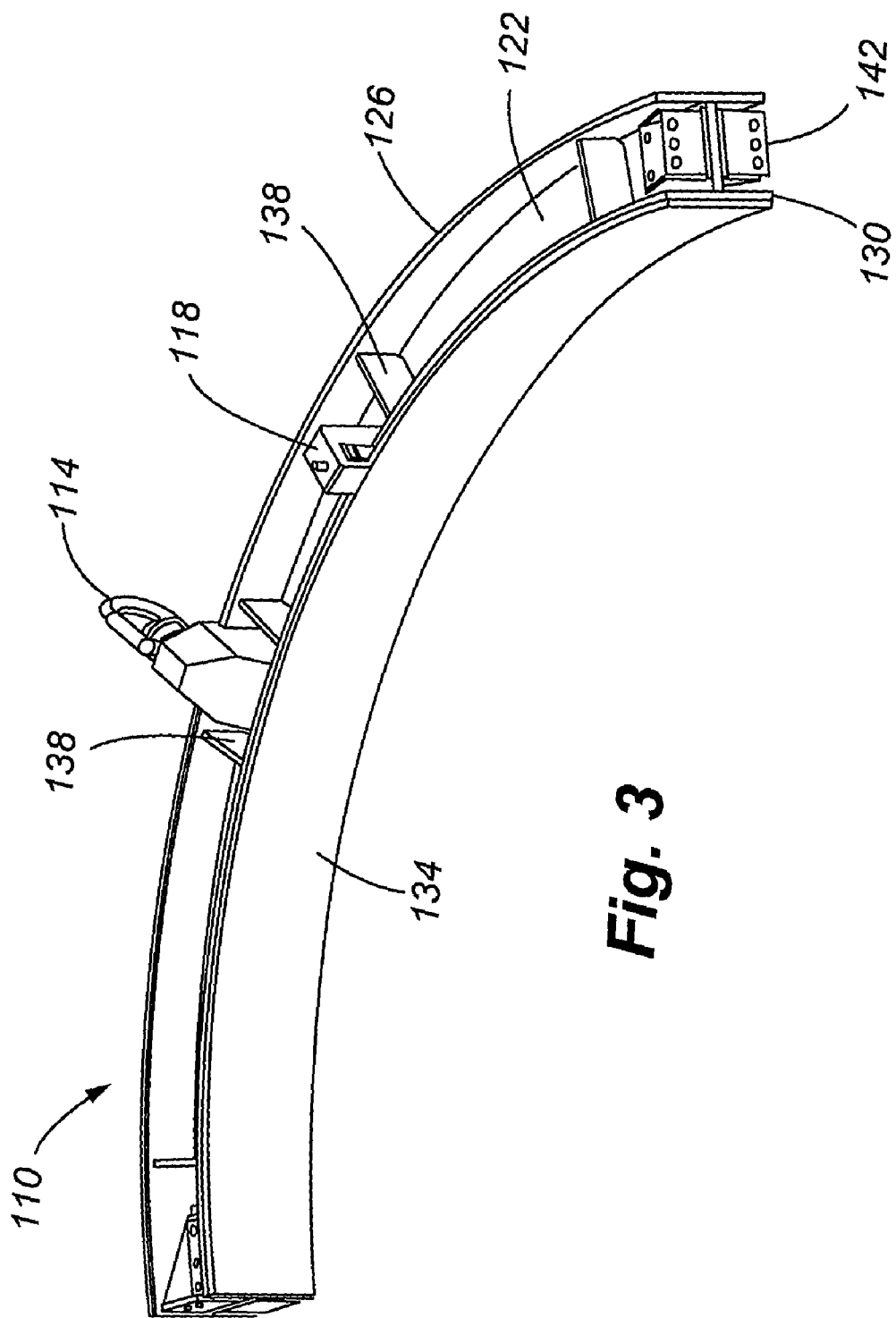
FIG. 3 is a detail view of FIG. 2.
Figure 4:
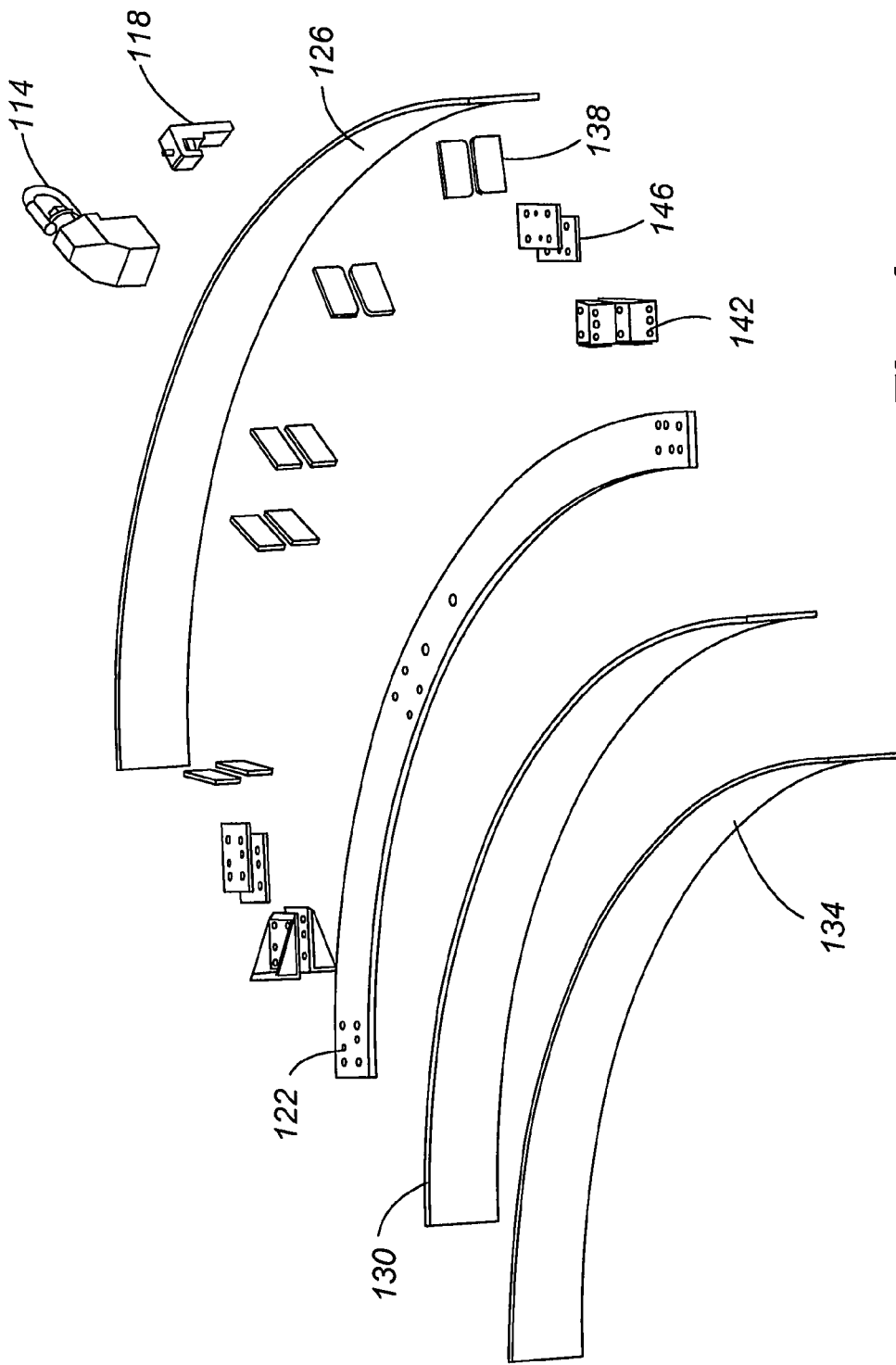
FIG. 4 is an exploded perspective view of FIG. 2.
Figure 5:
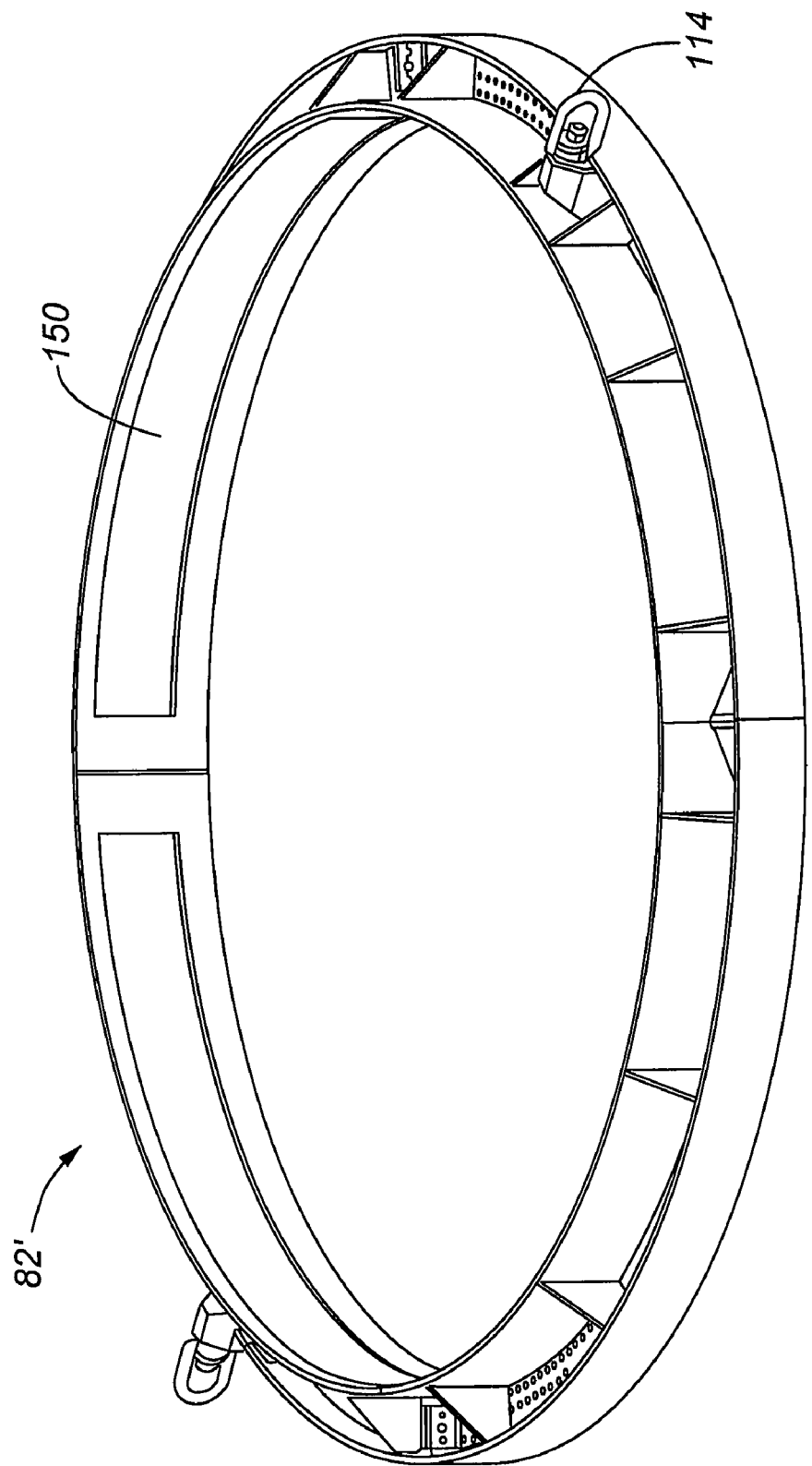
FIG. 5 is a perspective view of a lower ring assembly of the present invention.
Figure 6:
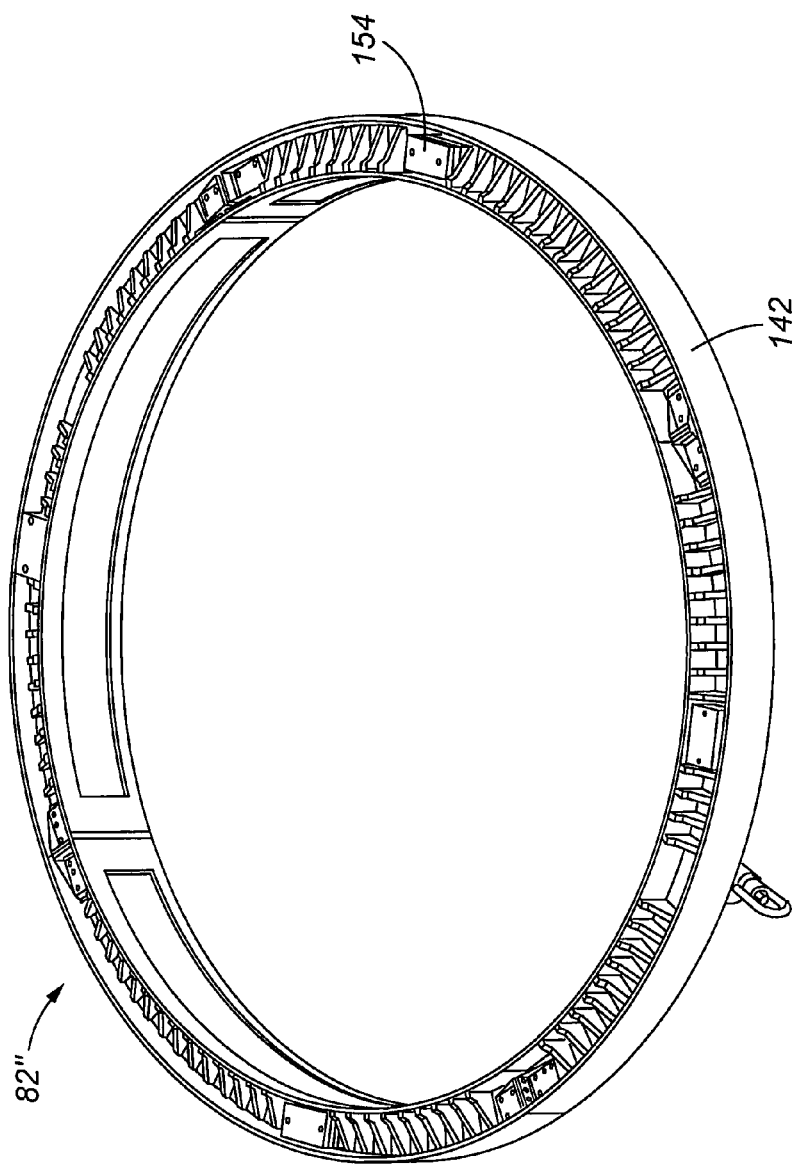
FIG. 6 is a bottom perspective view of a lower ring assembly.
Figure 7:
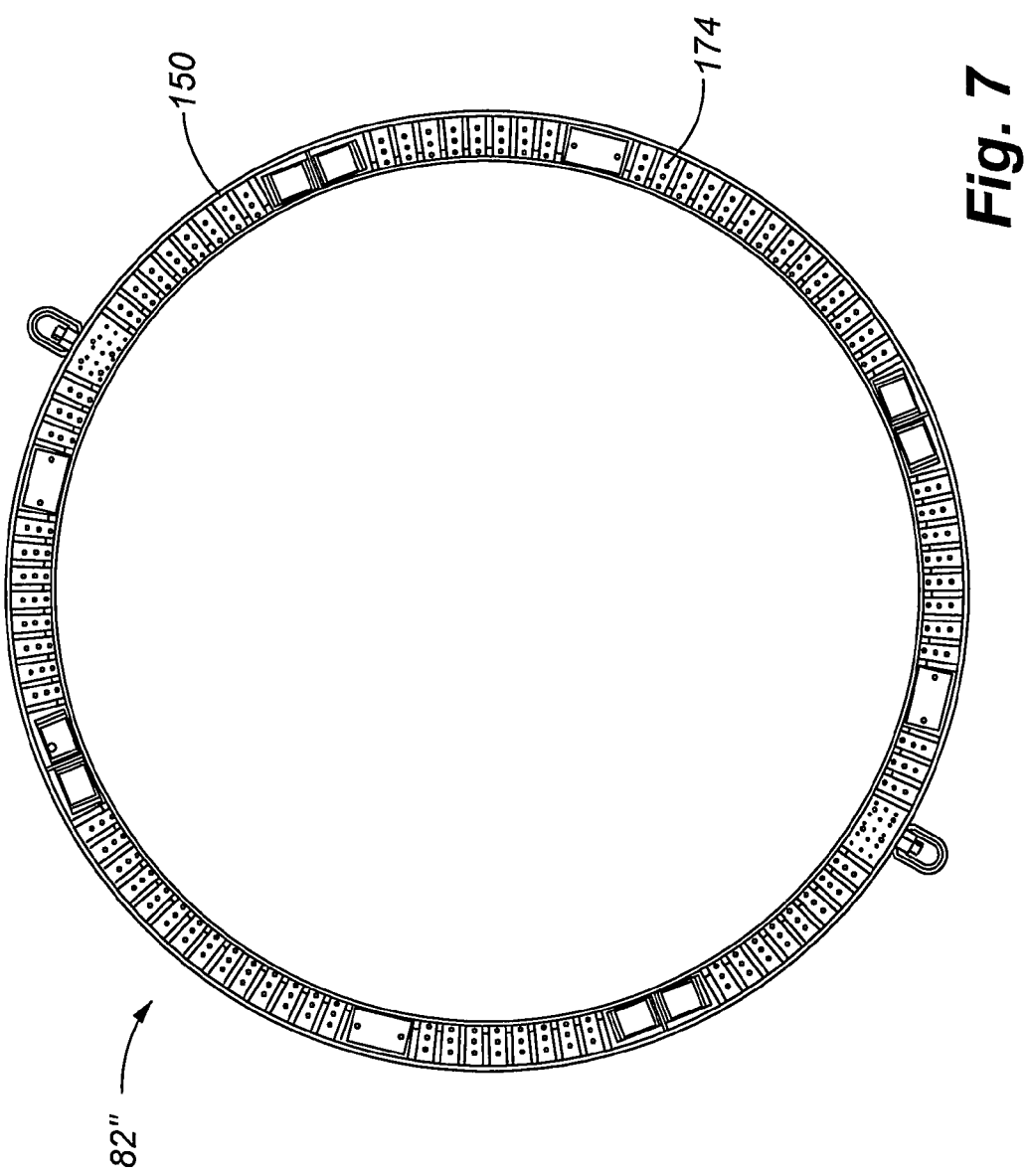
FIG. 7 is a bottom plan view of FIG. 5.

Referring now to FIGS. 2-4, details are shown of the upper ring assembly 78 of the present invention as showing it is generally circular in nature and has a plurality of upper ring segments 110. In order to facilitate handling of the upper ring assembly 78, a plurality of selectively interconnected lifting assemblies 114 may be employed. The upper ring assembly 78 also includes a plurality of capture hooks 118 that engage an upper surface of a barrel segment, for example, that are used to facilitate lifting and handling. The upper ring segments 110 are generally comprised of a center ring 122 that is sandwiched between an orthogonally oriented outer ring 126 and an orthogonally oriented inner ring 130. Padding 134 may be added to the inner ring 130 that engages the outer surface of the barrel segment to prevent damage thereto. The center ring 122 adheres to the outer ring 126 and inner ring 130 by way of a plurality of gusset plates 138 that are welded to the three ring structure as shown. The ring segments 110 are interconnected by way of segment clamps 142 that are also integrated onto the center ring 122. The segment clamps 142 may be associated with riser plates 146 that are interconnected to the center ring 122 as well. The lifting assemblies 114 may be simply an eye for receiving a hook or any other acceptable lifting assembly that facilitates movement and placement of the upper ring 78.

Figure 13:
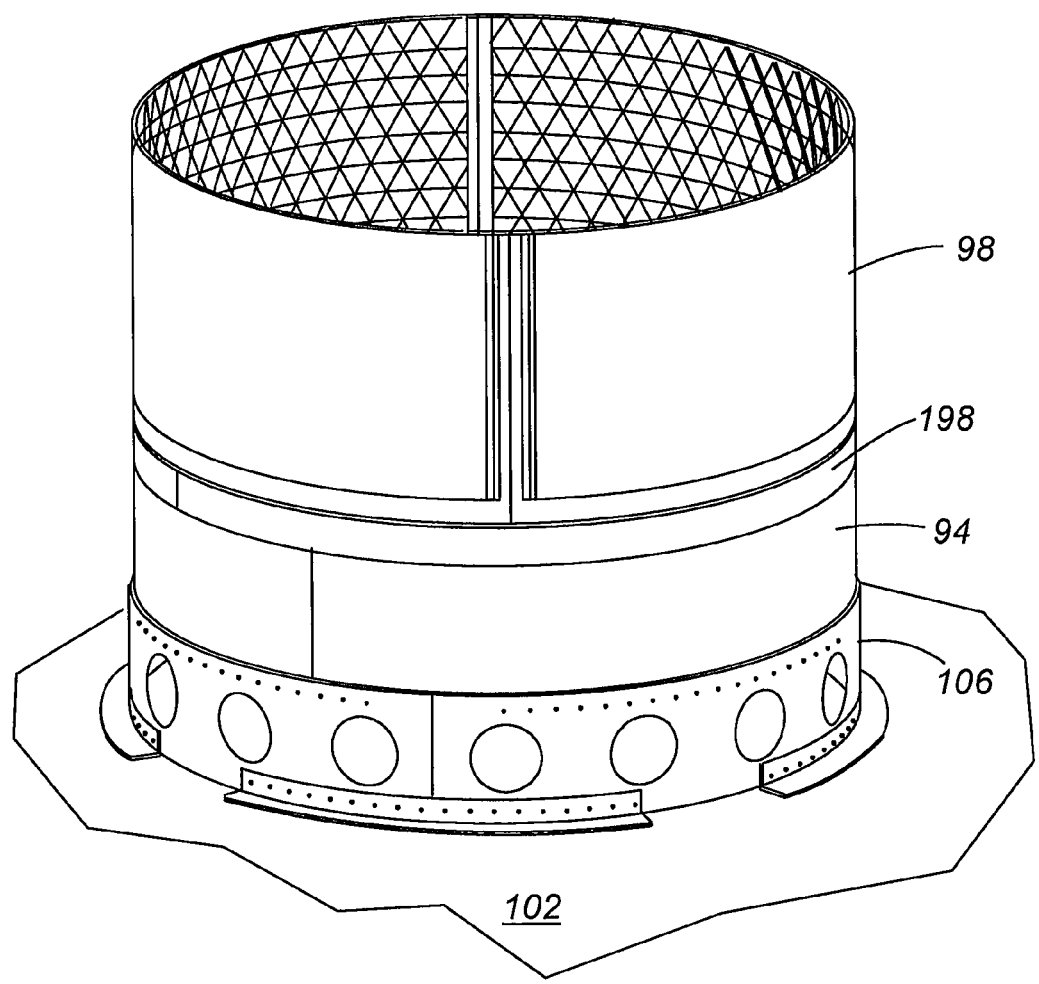
FIG. 13 is a perspective view of a barrel panel subassembly and dome assembly to be welded.
Figure 14:
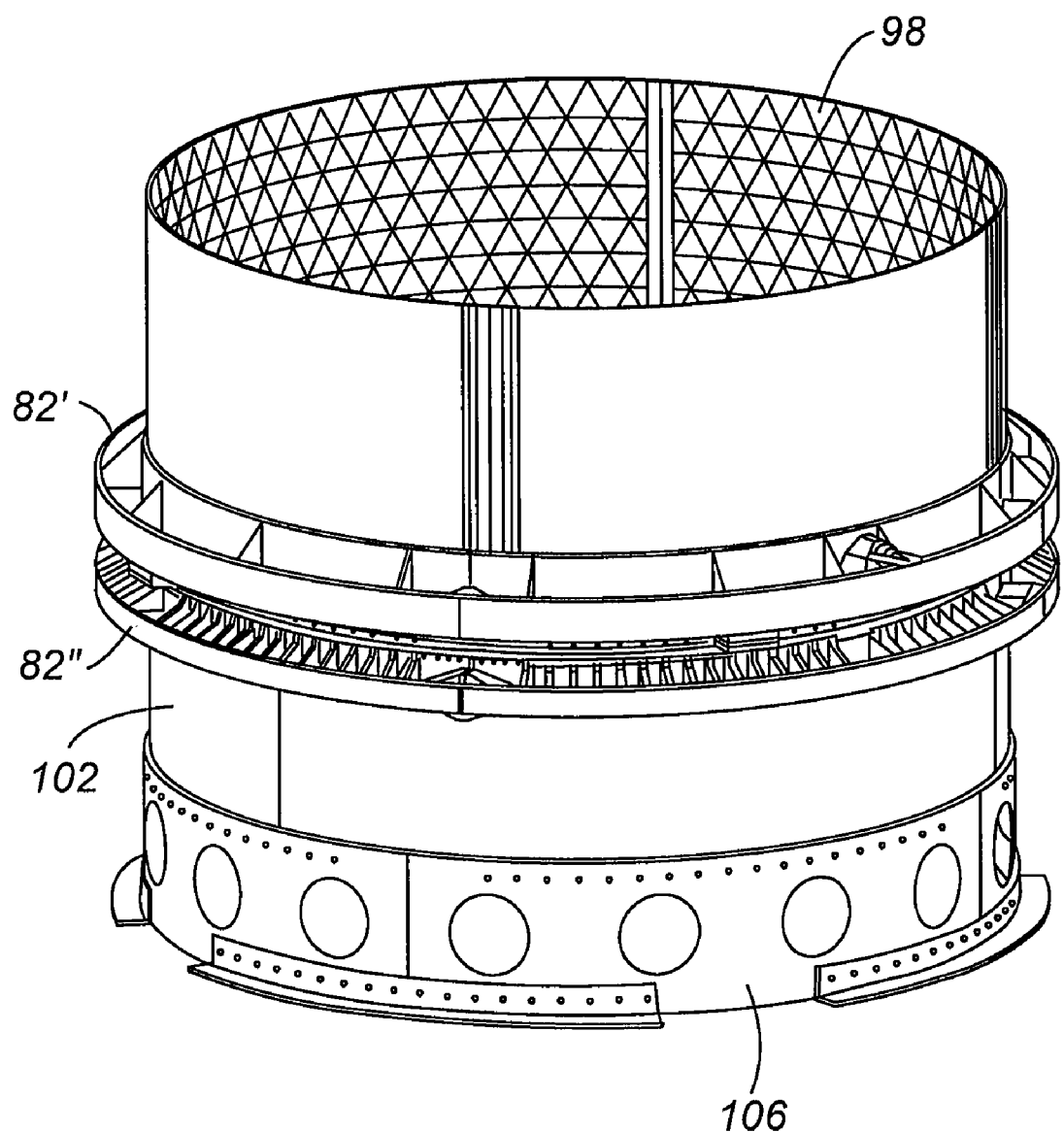
FIG. 14 is a perspective view of the barrel panel subassembly with interconnected external ring assembly that positions and retains the dome to the barrel panel subassembly.
Figure 15:
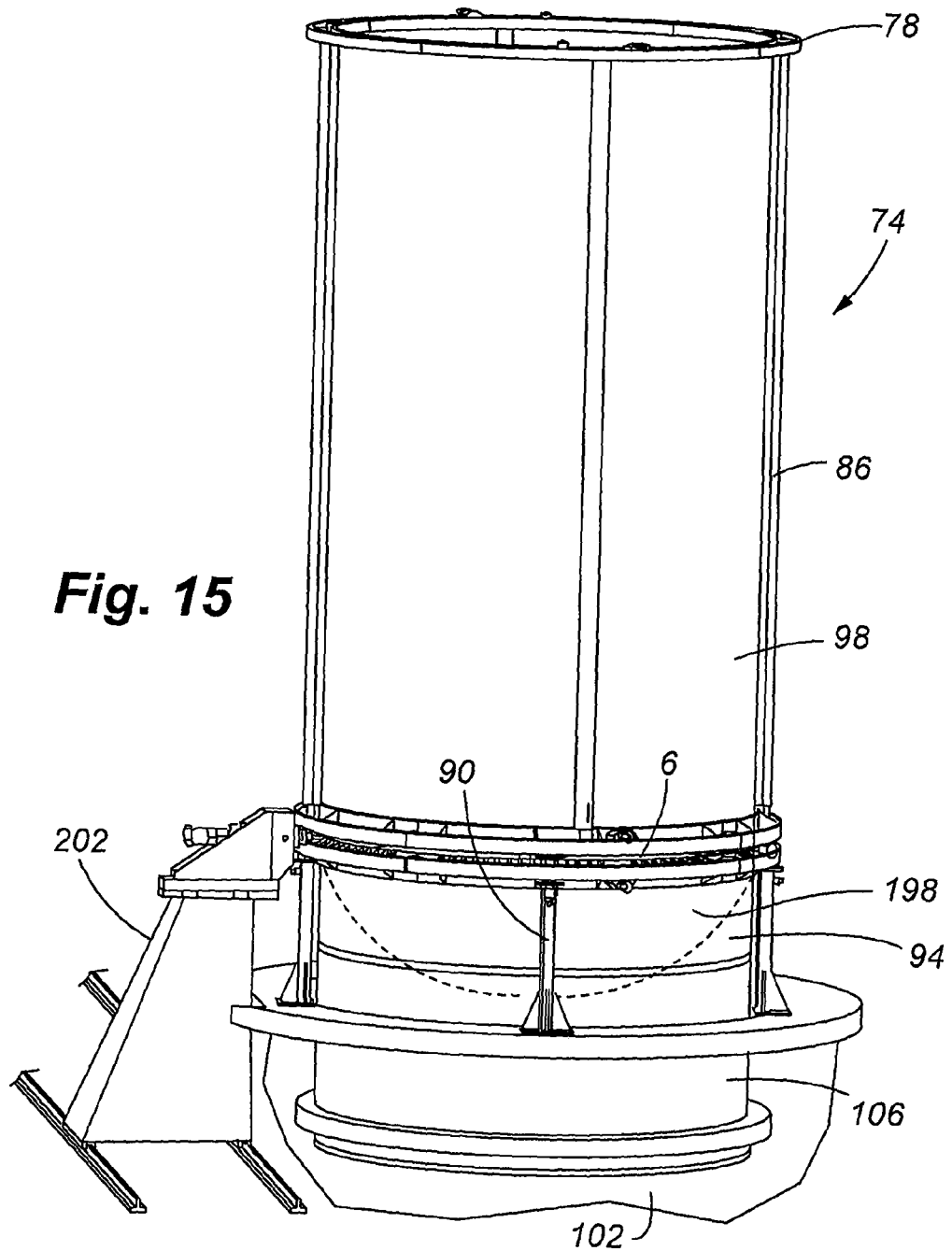
FIG. 15 is a perspective view showing a welding system of one embodiment of the present invention.
Figure 16:
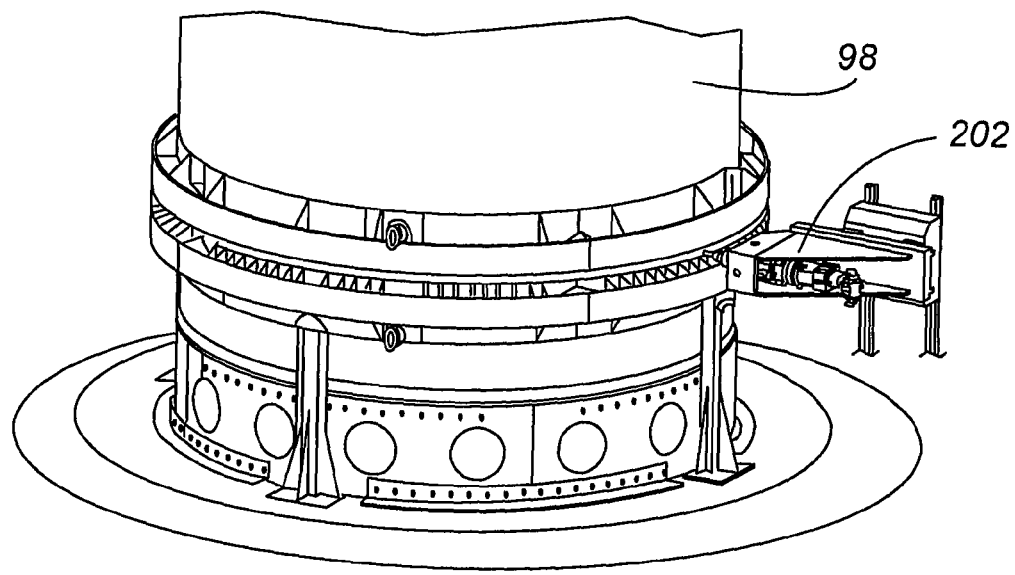
FIG. 16 is an enlarged detailed view of a lower portion of FIG. 15.

Referring now to FIGS. 5-9, the lower ring assembly 82 is shown. More specifically, FIG. 13 shows the lower ring assembly 82' in a standard position and FIG. 14 shows it in an inverted position 82". Similar to the upper ring assembly, the lower ring assembly 82 is comprised of a plurality of lower ring segments 150. Lifting assemblies 114 may also be associated with the lower ring assembly 82 to facilitate movement thereof. The lower ring segments 150 are interconnected to each other via a plurality of segment clamps 142. In addition, the lower ring assembly 82 may include jack extenders 154 for engagement with jack stands.

Figure 8:
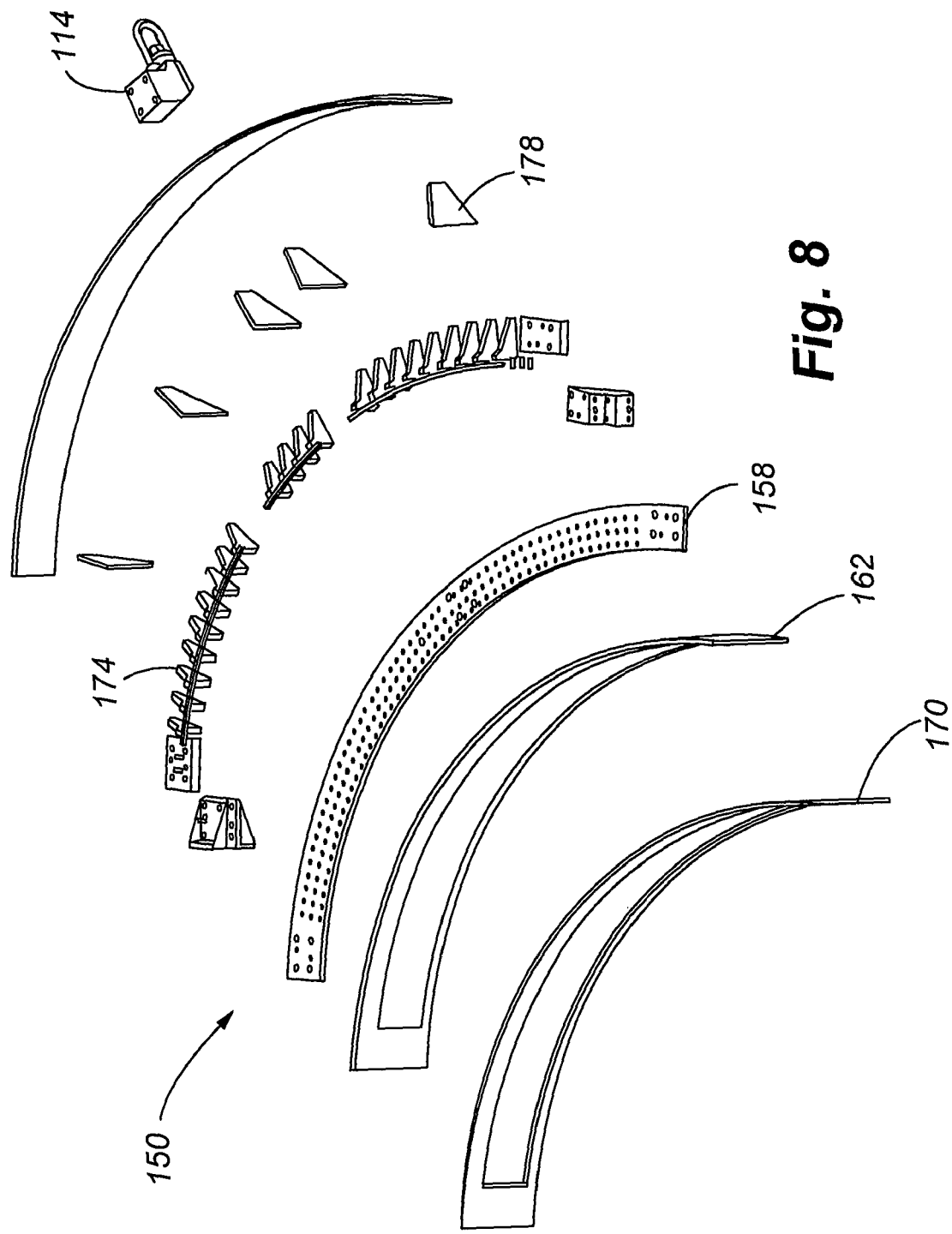
FIG. 8 is an exploded perspective view of a portion of the lower ring assembly.

Referring now specifically to FIG. 8, the lower ring segment 150 is shown that is comprised of a center ring 158 that is sandwiched between an inner ring 162 and an outer ring 166. Again, padding 170 may be employed on one side of the inner ring 162 that prevents damage to the tank components.

The inner ring 162 also receives a plurality of clamp assemblies 174 that will be described in further detail below. Gusset plates 178 may also be added to provide additional stiffness to the segment 150.

Figure 9:
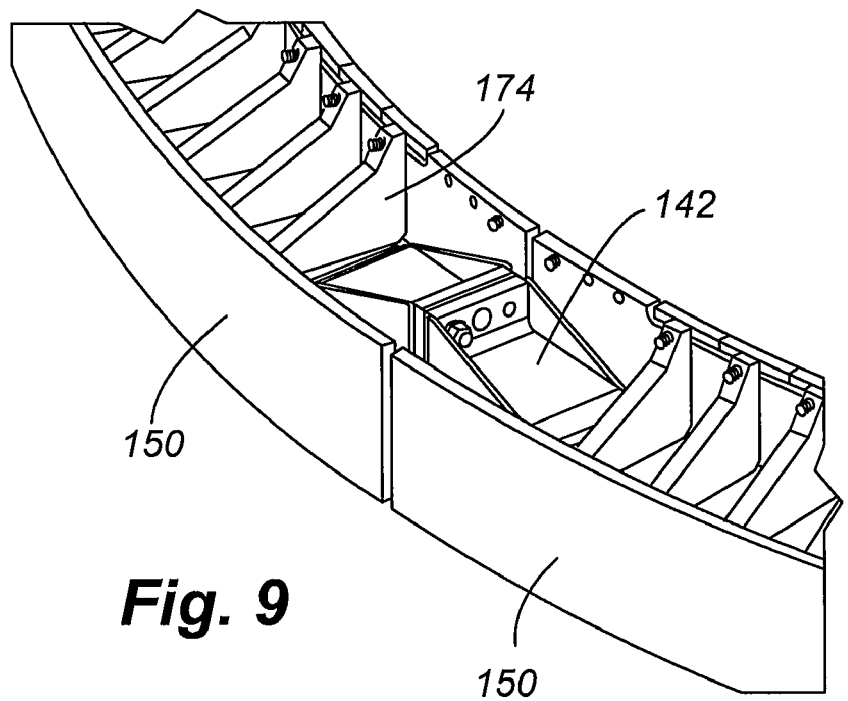
FIG. 9 is a detailed view of FIG. 5.
Figure 10:
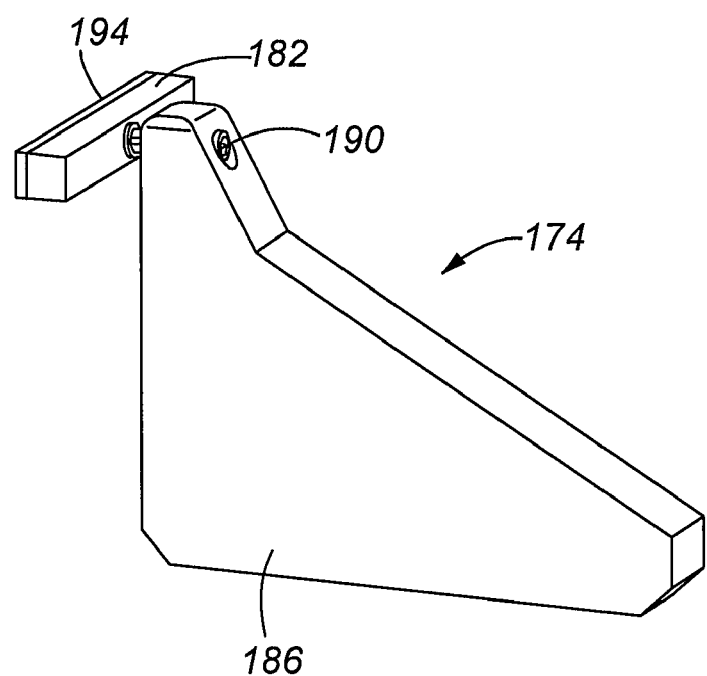
FIG. 10 is a perspective view clamp assembly as used in conjunction with a lower ring assembly.
Figure 11:
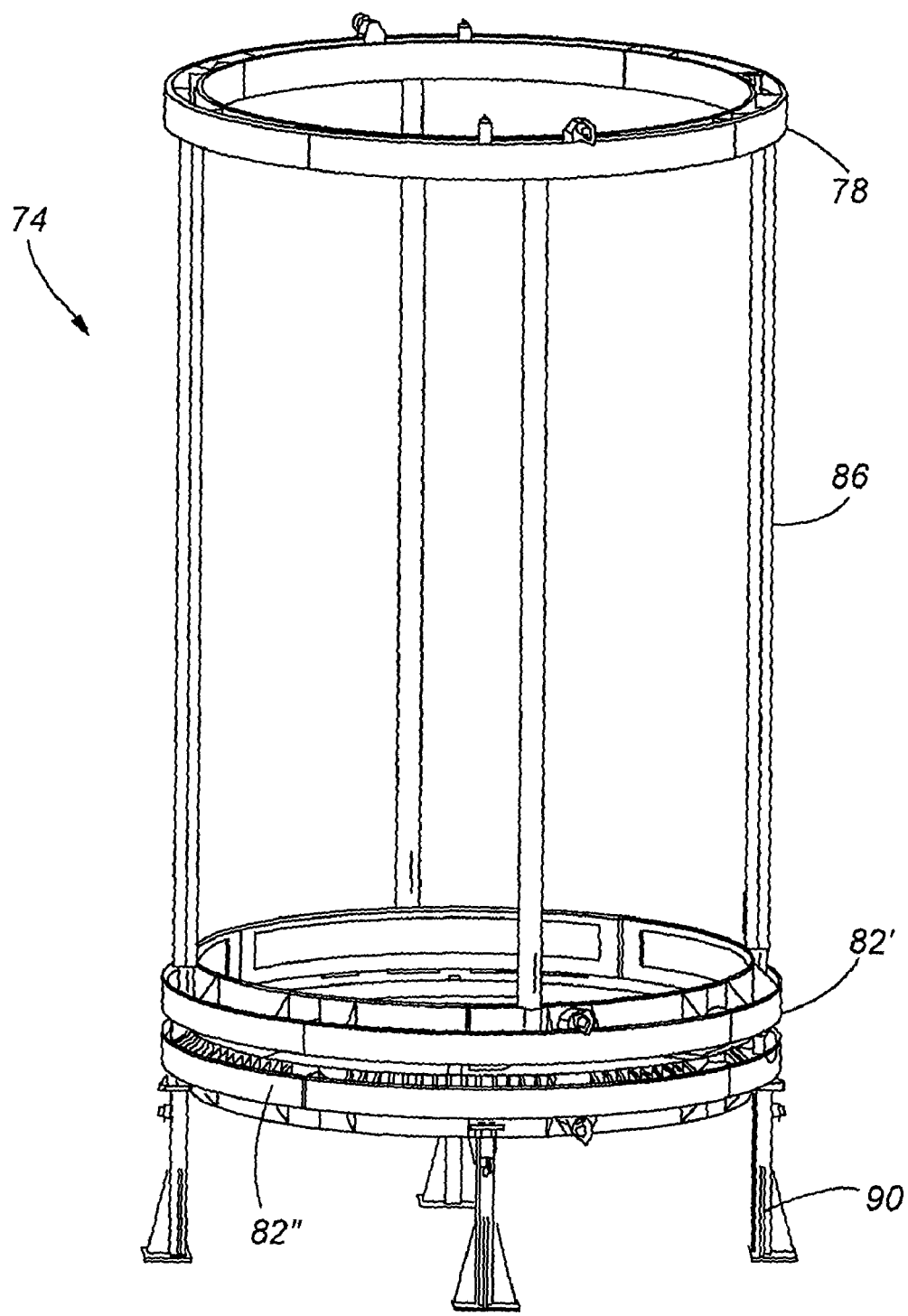
FIG. 11 is a perspective view of a weld fixture of the present invention comprising an externally-positioned upper ring assembly and two externally-positioned lower ring assemblies interconnected by a linkage and supported by a jack stand.

Referring now to FIGS. 9 and 10, the clamp assembly 174 of one embodiment of the present invention is shown. Here, the clamp assemblies 174 are shown interconnected to the center ring 158. The clamp assemblies 174 each include a push guide 182 that is selectively interconnected to a base 186 by way of a swivel clamp 190. The push guide 182 also includes padding 194 for engagement onto an outer diameter of the tank. In some embodiments the padding 194 is comprised of rubber, Polytetrafluoroethylene (Teflon®), or any similar material that will not damage the work pieces. The padding may also be comprised, at least partially, of a soft metal such as copper or silver that acts as a heat sink that facilitates cooling of the weld and thus enhances the weld's properties. The swivel clamp 190 allows translational and rotational movement of the push guide 182 to ensure a tight fit between the ring assembly and the work piece. The push guides 182 help ensure that the work pieces are properly aligned and mismatch is reduced. More specifically, the push guides are each selectively adjustable and are capable of moving the work piece to which they are associated. For example, the push guides 182 of one embodiment are capable of minute adjustments on the order of about 0.001 to 1.0 inches. In one embodiment the push guide 182 pushes inboard on the work piece that is too far outboard by rotating a threaded screw on a finger guide that attaches to a finger base and therefore moving the finger guide in or out to adjust the mismatch. Often a laser measurement device is used to assess mismatches that are addressed prior to or during work piece fusion. The mismatch reduction process can be automated.

Figure 12:
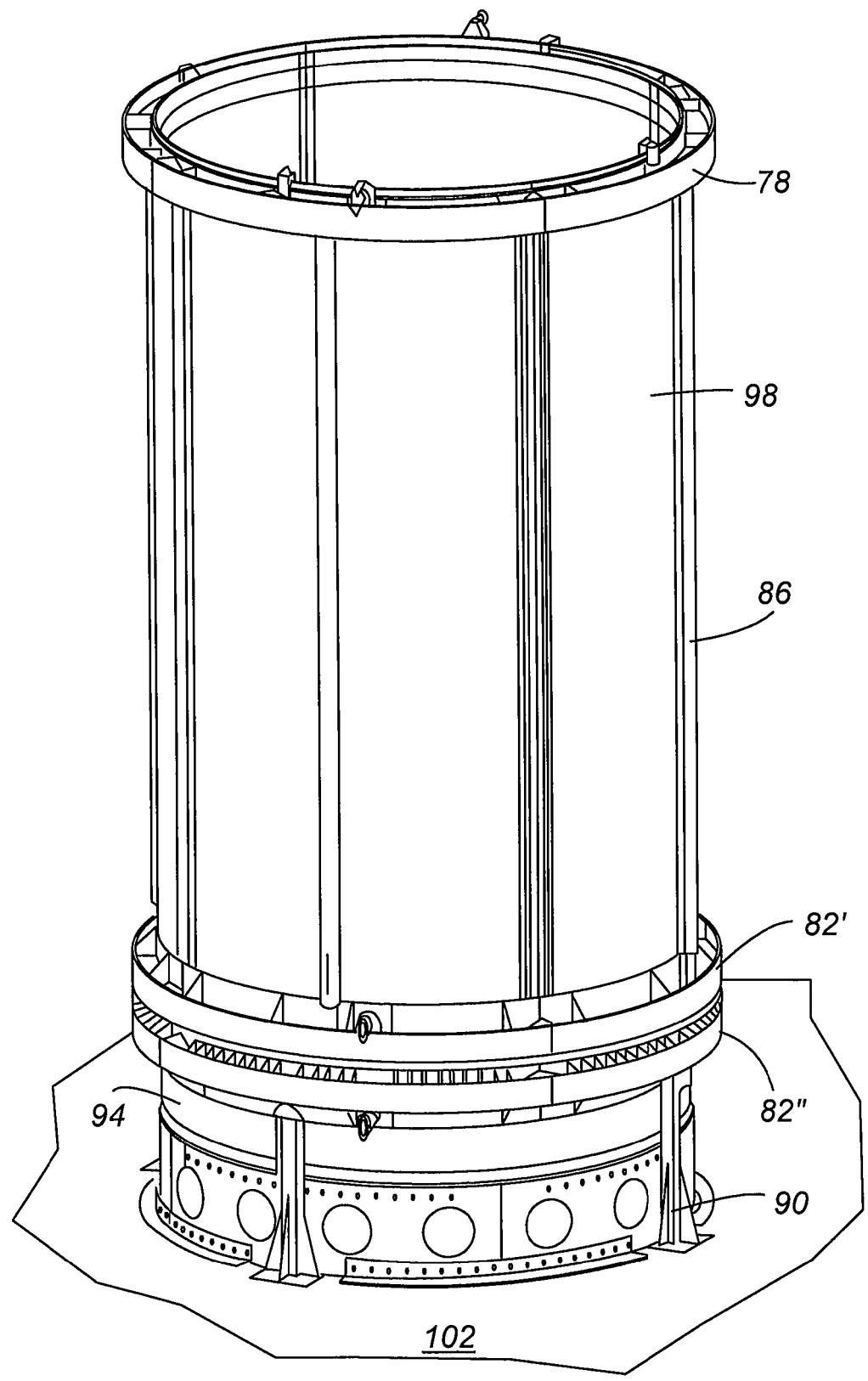
FIG. 12 is a perspective view of the weld fixture shown in FIG. 11 associated with barrel panels.

Referring now to FIGS. 11-17, a weld fixture 74 of one embodiment of the present invention is shown that is comprised of an upper ring assembly 78 that is spaced from a plurality of lower ring assemblies 82. A first lower ring assembly 82' is connected with the upper ring assembly 78 by way of a plurality of linkages 86. A second lower ring assembly 82" is spaced from the first lower ring assembly 82' and is supported by a plurality of jack stands 90. The lower ring assemblies 82' and 82" are arranged so that one ring assembly is present on one side of the joint 6 and the other ring assembly is placed on the other side of the joint. In FIGS. 12-14, the circumferential joint 6 is formed by mating a skirt 94 to a barrel segment 98. In operation, the first lower ring assembly 82' is separated from the second lower ring assembly 82" that is inverted as compared to the first lower ring assembly. The skirt 94 ultimately rests on a turn table 102. The second lower ring assembly 82" rests on a plurality of jack stands 90 that are also interconnected to the turn table 102. In operation, a friction stir welding pin tool 58 (See FIG. 2) is associated with the circumferential joint 6 while the barrel segment 98, associated skirts 94, and fixture 74 are rotated relative thereto. The upper ring assembly 78 has a function of supporting the first lower ring assembly 82', but it is not required to perform the circumferential weld operation. The ring assemblies are comprised of various segments that are engaged onto an outer surface of the barrel segment 98 or skirts 98 and do not require penetration into the thickness thereof. The use of the previously-described pin tool 58 also omits the need for an internal mandrel positioned within the tank.

Figure 19:
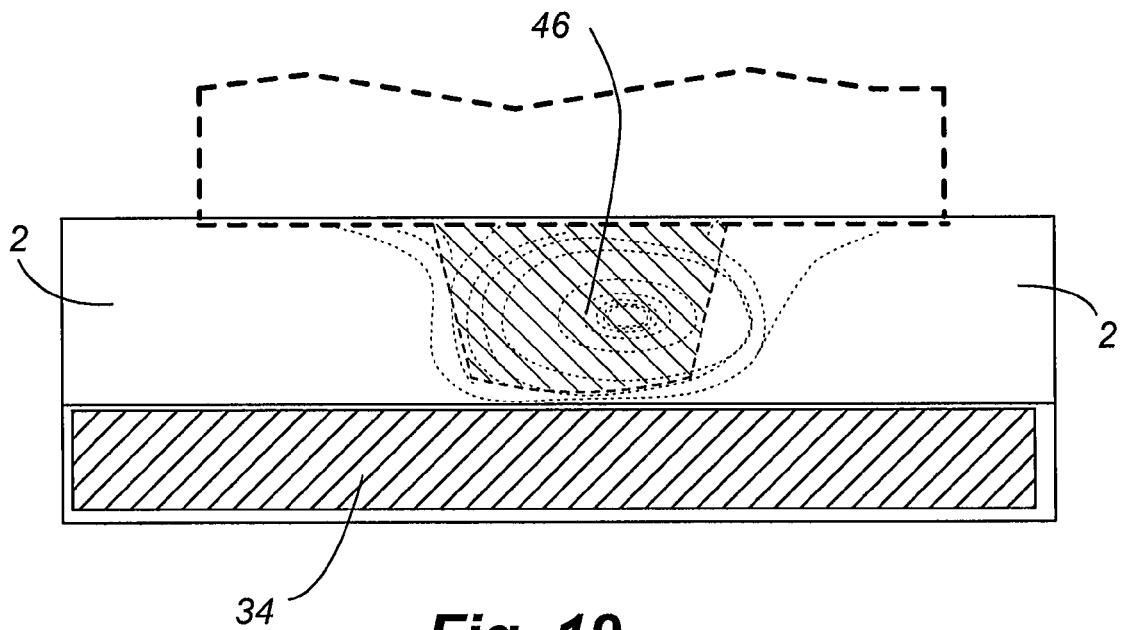
FIG. 19 is a cross-sectional representation of a prior art friction stir weld that requires a backing anvil.
Figure 20:
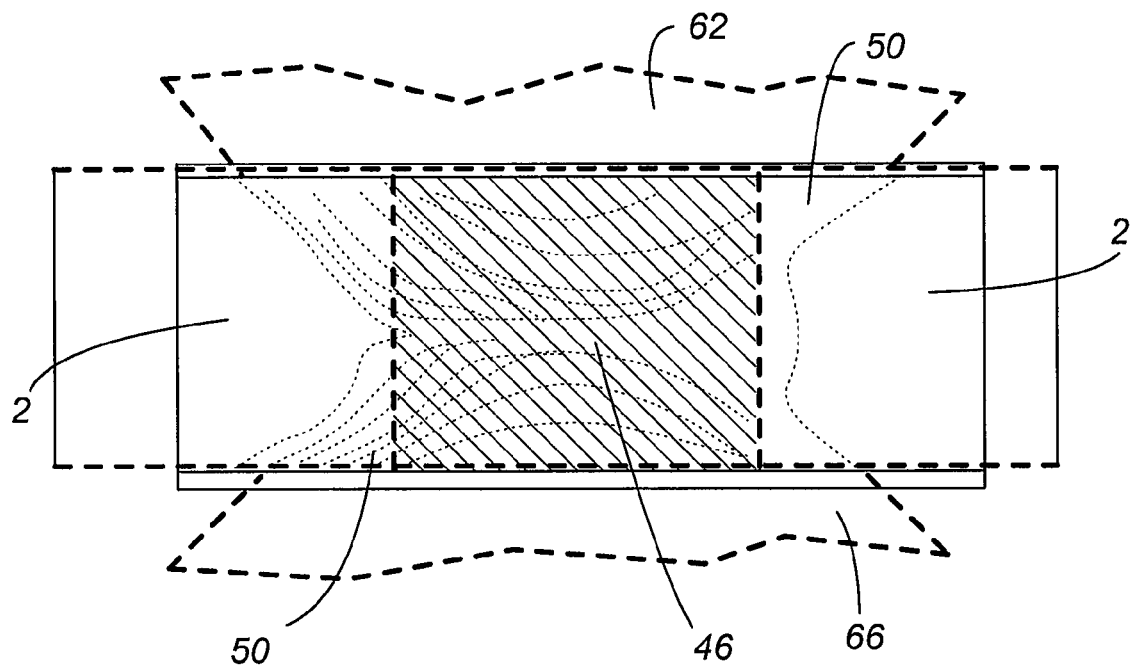
FIG. 20 is a cross-sectional representation of a circumferential friction stir weld formed by the tool of FIG. 18.

Referring now specifically to FIGS. 11-14, the upper ring assembly 78 is shown associated with an upper portion of the barrel segment 98. A plurality of linkages 86 extend downwardly from the upper ring assembly 78 and are interconnected to a lower ring assembly 82'. The inverted lower ring assembly 82" is spaced from the first lower ring assembly 82'. The barrel segment 98 rests atop the skirt 94 and is welded thereto. A circumferential joint (see FIG. 17) is defined by the engagement of the barrel panel onto the skirt 94. A spacer 106 may also be used to associate the skirt with the turn table 102. Referring now to FIGS. 19 and 20, the weld fixture 74 of one embodiment of the present invention is shown. In operation, a spacer 106 is associated with the turn table 102. A skirt 94 is situated on the spacer 106. Within the skirt 94 resides a dome 198 that includes a lip for engagement with the skirt 94 and a plurality of barrel segments 98. These items are stacked vertically and the ring assemblies are placed around the joints. The entire assembly, along with the weld fixtures 74 then rotated with respect to a welding assembly 202 to create the circumferential friction stir welds. The vertical stacking of the components has advantages over the prior art described above.

Figure 17:
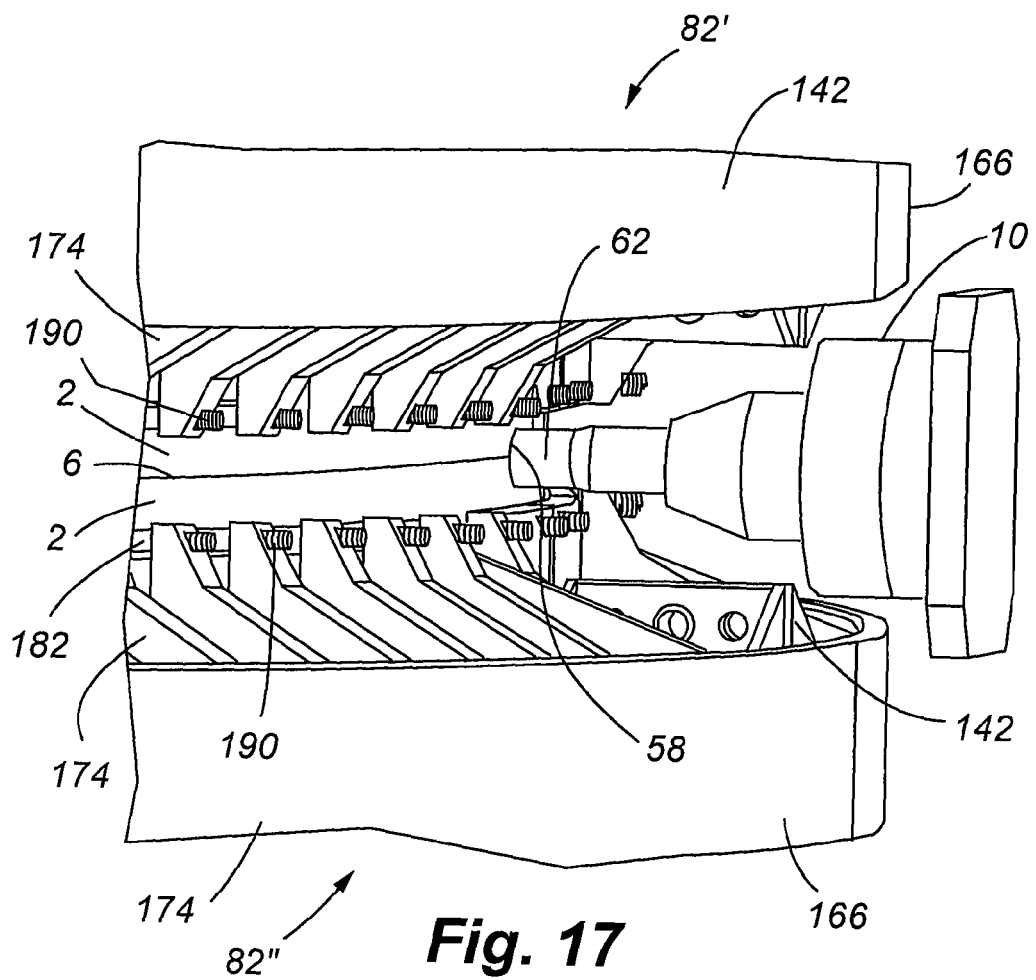
FIG. 17 is an enlarged detailed view of the weld head and associated pin engaged on a circumferential joint wherein the work pieces are supported by rings having finger clamps.
Figure 18:
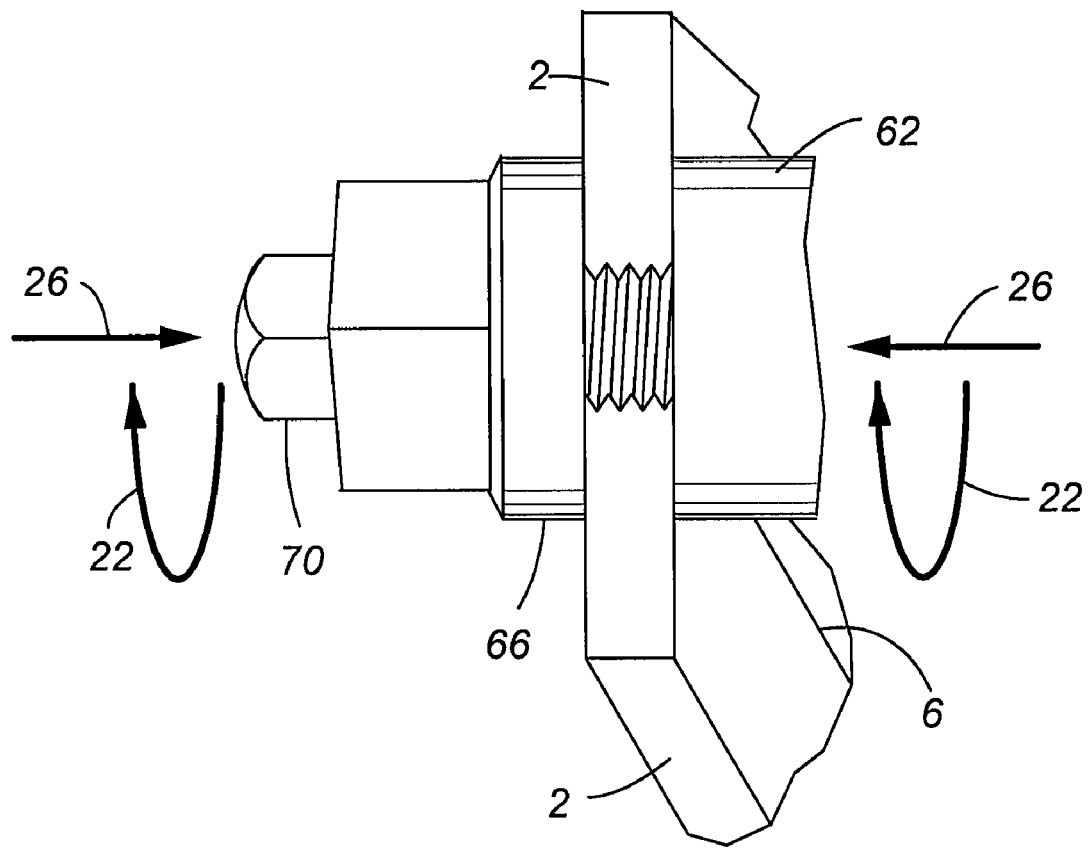
FIG. 18 is an enlarged elevation view of a self reacting pin tool used in the welding system.

Referring now to FIGS. 17 and 18, a self reacting pin tool 58, also referred to herein as ("pin tool") is shown. The pin tool 58 is interconnected to a weld head 10. The pin tool 58 includes a top shoulder 62 that is spaced from a bottom shoulder 66 with a pin 18 therebetween. The space between the top shoulder 62 and the bottom shoulder 66 is generally equal to the thickness of the work pieces 2 being mated. The pin 18 is adapted to spin and travel along the joint 6 between the work pieces 2. The construction of the weld fixture discussed below, allow external forces and internal forces 26 generated by the pin tool 58 to counteract each other, thereby omitting the need for inner internal mandrel. The bottom shoulder 66 is interconnected to the pin 18 by way of a nut 70 or similar member, and is positioned within the interior of the member being welded. Retrieval of the nut 70 and bottom shoulder 66 is much easier compared to retrieval of a backing mandrel or internal supports traditionally used because the nut is much smaller than large internal supports. As shown in FIG. 2, the joint 6 is circumferential and is positioned between ring assemblies, which will be described in further detail below. Although a circumferential weld is shown, the use of a self reacting pin tool 58 may find equal application in traditional linear friction stir welding operations.

Referring now to FIGS. 19 and 20, the weld nugget 46 is generally u-shaped and tapers towards the backing anvil 34. Conversely, with reference to FIG. 20, the weld nugget 46 is located generally in the center of the work pieces 2 wherein stirring of the parent material has occurred completely through the thickness of the abutting edge of the parent materials. Stirring of the parent material in this manner will result in a complete weld penetration.

Figure 21:
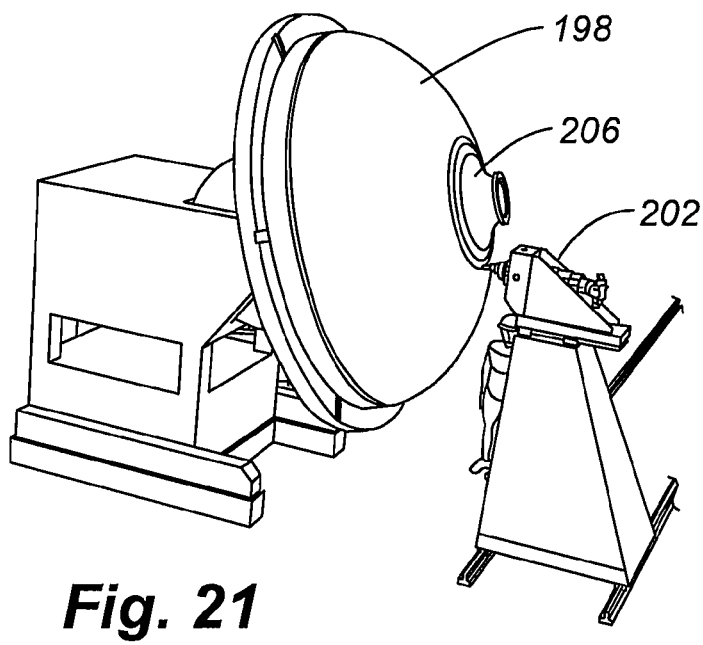
FIG. 21 is a perspective view showing another welding system of the present invention located adjacent to a dome and a sump.

FIG. 21 illustrates that the friction stir welding technique described herein may have applications related to eccentric orientations of work pieces. Here, a sump 206 is welded onto a dome. The interface related thereto is neither circumferential nor linear and the weld is being added an angle. The circumferential self reacting pin tool may be used in this situation as well. The dome is spun by another turn table relative to the weld assembly. Alternatively, the dome can be help in place on a fixture and a six-axis friction stir welding tool may be employed.

Figure 22:
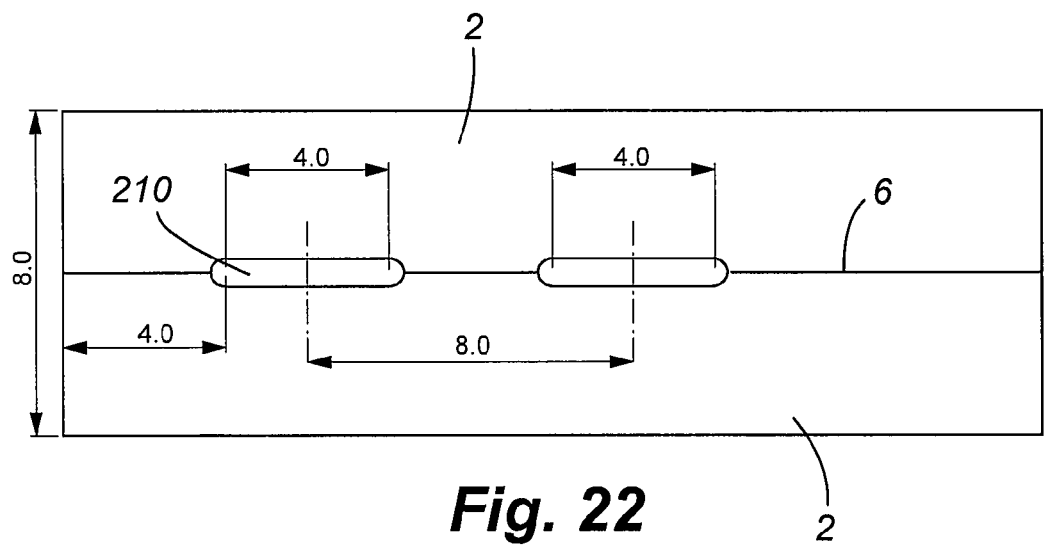
FIG. 22 is a representation of a tack weld formed in accordance with the present invention.
Figure 23A:
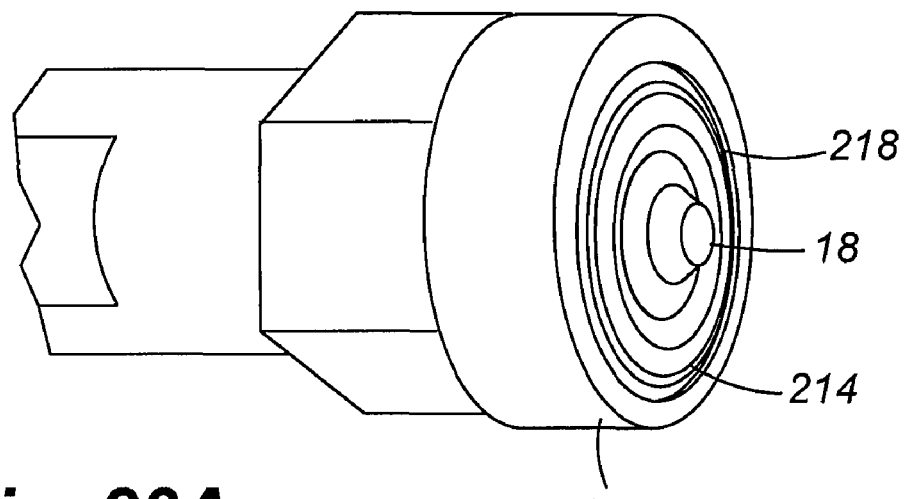
FIGS. 23A and 23B are views of a pin employed to create a tack weld in accordance with the invention.
Figure 23B:
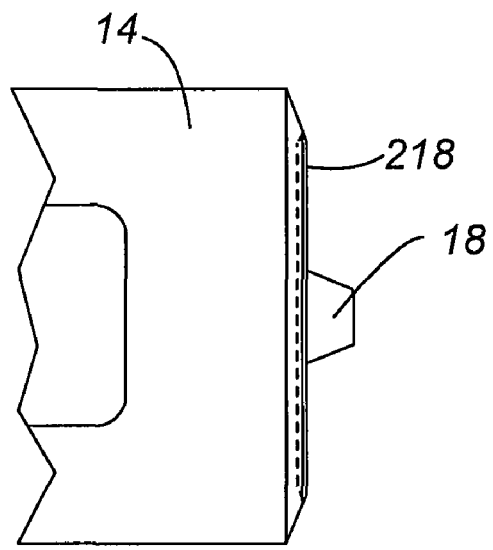

Referring now to FIGS. 22 and 23, in order to help hold work pieces 2 together prior to and during the creation of the primary weld, a plurality of tack welds 210 are initially created in the joint. The tack welds 210 are preferably spaced about 8 inches from their center, but may be spaced any distance apart. Tacking in this manner also helps prevent mismatches between the work pieces 2.

In one embodiment, the tack welds are formed with a specialized tool that generates low forge loads. One of skill in the art will appreciate that the tool shown possesses a small shoulder 14 and lengthen pin 18. The tool shown generates a low forge load while producing an acceptable tack weld. The lengthened pin 18 provides increased penetration and the shoulder 14 provides sufficient mixing to create the tack weld. The tool may also include a shoulder within a spinal pattern 214 and a conical pin. The spiral pattern necessarily has a groove 218 that helps dissipate heat. This new tool achieves a weld that was previously achieved with higher forge loads, which required a backing member to counteract the same.

In operation, subsequent to the creation of a series of tack welds about the circumference of the work pieces, a hole is drilled into the joint. The self reacting pin tool is placed within the hole and the inner shoulder thereof is interconnected to the pin. The self reacting pin tool is then used to weld the entirety of the circumferential joint 6. When the tool is located proximate to a tack weld 210, the tack 210 weld will be destroyed in favor of the new primary weld. The head 10 that controls the pin 58 may be automated wherein weld parameters are adjusted during weld development. At the end of the welding process, the inner shoulder of the self reacting pin tool is removed and the pin is removed from the joint to reveal a single hole that is plugged. The plugged area, and often the weld in its entirety, is planished or otherwise machined to facilitate inspection thereof.

While various embodiments of the present invention have been described in detail, it is apparent that modifications and alterations of those embodiments will occur to those skilled in the art. Moreover, references made herein to "the present invention" or aspects thereof should be understood to mean certain embodiments of the present invention and should not necessarily be construed as limiting all embodiments to a particular description. However, it is to be expressly understood that such modifications and alterations are within the scope and spirit of the present invention, as set forth in the following claims.

What is claimed is:

1. A friction stir welding system for welding a first cylindrical component to a second cylindrical component, the first cylindrical component and the second cylindrical component being arranged vertically with respect to one another and abutted at facing edges to form a horizontally extending seam, comprising:
    a first ring assembly positioned to support a first end of the first cylindrical component, said first ring assembly having an inner ring interconnected to an outer ring by a center ring;
        a second ring assembly positioned to support a second end of the first cylindrical component on one side of the seam, said second ring assembly positioned below said first ring assembly, and comprising an inner ring interconnected to an outer ring by a center ring;
    a third ring assembly positioned to support a first end of the second cylindrical component on a side of the seam opposite from said first ring assembly, said third ring assembly positioned below said first and second assemblies, and said third ring assembly comprising an inner ring interconnected to an outer ring by a center ring;
        at least one linkage that interconnects said first ring assembly to said second ring assembly; and
        at least one stand positioned below said ring assemblies that supports a second end of said third ring assembly.

2. The system of claim 1 further including:
    at least one capture hook for engagement with an edge of said first cylindrical component.

3. The system of claim 1 wherein said at least one stand is interconnected to a turn table that rotates said first ring assembly, said second ring assembly and said third ring assembly relative to a weld assembly.

4. The system of claim 3 wherein said weld assembly includes a self-reacting pin tool that is associated with the seam.

5. The system of claim 1 wherein said second ring assembly and said third ring assembly is used to facilitate bonding of the work pieces without an internal mandrel or any internal support for the hardware.

6. The system of claim 1, wherein said first ring assembly, said second ring assembly and said third ring assembly each include pads that are adapted to contact the first cylindrical component and the second cylindrical component.

7. The system of claim 1, wherein said first ring assembly, said second ring assembly and said third ring assembly are each comprised of four selectively interconnected segments.

8. The system of claim 1, wherein said second ring assembly and said third ring assembly include at least one clamp assembly that includes a guide for engagement with at least one of the first cylindrical component and the second cylindrical component by way of an adjustable member associated with said at least one clamp.

9. The system of claim 8, wherein said adjustable member is capable of moving the first cylindrical component and the second cylindrical component about 0.001 inches to about 1.0 inches.

10. The system of claim 1, wherein the first cylindrical component is a barrel segment of a rocket booster tank and the second cylindrical component is a skirt of a rocket booster tank.

11. A friction stir welding system that maintains and selectively alters a first work piece and a second work piece being bonded by friction stir welding, wherein the work pieces are abutted to form a seam, comprising:
    a first ring assembly positioned adjacent to a first end of the first work piece;
        a second ring assembly positioned adjacent to a second end of the first work piece on one side of the seam and located adjacent an external side of the first work piece, said second ring assembly comprising an inner ring interconnected to an outer ring by way of a center ring; a plurality of clamp assemblies interconnected to a first surface of said center ring; and a plurality of plates interconnected to a second surface of said center ring;
    a third ring assembly positioned adjacent an external side of a first end of the second work piece and adjacent the other side of the seam;
    at least one linkage that interconnects said first ring assembly to said second ring assembly; and
    at least one adjustable stand that supports a second end of said third ring assembly.

12. The system of claim 11 wherein said first ring assembly comprises:
    an inner ring interconnected to an outer ring by way of a center ring; and
    at least one capture hook for engagement with the first edge of the first component.

13. The system of claim 11 wherein said third ring assembly comprises:
    an inner ring interconnected to an outer ring by way of a center ring;
        a plurality of clamp assemblies interconnected to a first surface of said center ring; and a plurality of plates interconnected to a second surface of said center ring.

14. The system of claim 11 wherein said at least one adjustable stand is interconnected to a turn table that rotates said first ring assembly, said second ring assembly and said third ring assembly relative to a weld assembly.

15. The system of claim 14 wherein said weld assembly includes a self-reacting pin tool for association with the seam.

16. The system of claim 11 wherein said second ring assembly and said third ring assembly is used to facilitate bonding of the work pieces without an internal mandrel or any internal support for the hardware.

17. The system of claim 11, wherein at least one of said second ring assembly and said third ring assembly include a plurality of adjustable members that are capable of moving the adjacent work pieces about 0.001 inches to about 1.0 inches.

18. A friction stir welding system that maintains and selectively alters a first work piece and a second work piece being bonded by friction stir welding, wherein the work pieces are abutted to form a seam, comprising:

a first ring assembly positioned adjacent to a first end of the first work piece;

a second ring assembly positioned adjacent to a second end of the first work piece on one side of the seam and located adjacent an external side of the first work piece;

a third ring assembly positioned adjacent an external side of a first end of the second work piece and adjacent the other side of the seam, said third ring assembly comprising an inner ring interconnected to an outer ring by way of a center ring; a plurality of clamp assemblies interconnected to a first surface of said center ring; and a plurality of plates interconnected to a second surface of said center ring;

at least one linkage that interconnects said first ring assembly to said second ring assembly; and at least one adjustable stand that supports said third ring assembly.

\* \* \* \* \*